(12) United States Patent
Danjyo

(10) Patent No.: US 10,482,860 B2
(45) Date of Patent: Nov. 19, 2019

(54) KEYBOARD INSTRUMENT AND METHOD

(71) Applicant: CASIO COMPUTER CO., LTD., Tokyo (JP)

(72) Inventor: Makoto Danjyo, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/230,599

(22) Filed: Dec. 21, 2018

(65) Prior Publication Data

US 2019/0198001 A1   Jun. 27, 2019

(30) Foreign Application Priority Data

Dec. 25, 2017  (JP) .................................. 2017-248278

(51) Int. Cl.
*G10H 1/34* (2006.01)
*G10H 1/00* (2006.01)
*G10C 3/12* (2006.01)

(52) U.S. Cl.
CPC ............... *G10H 1/344* (2013.01); *G10C 3/12* (2013.01); *G10H 1/0041* (2013.01)

(58) Field of Classification Search
CPC ...................................................... G10H 1/344
See application file for complete search history.

(56) References Cited

U.S. PATENT DOCUMENTS

| 4,594,931 | A | * | 6/1986 | Ishii | ..................... | G10H 1/0041 |
|---|---|---|---|---|---|---|
| | | | | | | 84/609 |
| 4,622,879 | A | * | 11/1986 | Matsubara | ............... | G10H 1/26 |
| | | | | | | 84/609 |
| 5,355,762 | A | * | 10/1994 | Tabata | ................. | G10H 1/0008 |
| | | | | | | 84/609 |
| 6,153,822 | A | * | 11/2000 | Toba | ........................ | G10H 1/00 |
| | | | | | | 84/724 |
| 7,053,290 | B2 | * | 5/2006 | Tagawa | ................ | G10H 1/0008 |
| | | | | | | 84/609 |
| 7,129,407 | B2 | * | 10/2006 | Hiratsuka | ............ | G10H 1/0008 |
| | | | | | | 84/609 |

(Continued)

FOREIGN PATENT DOCUMENTS

JP    H05-134662 A    5/1993
JP    06-076995 U    10/1994

(Continued)

*Primary Examiner* — Robert W Horn
(74) *Attorney, Agent, or Firm* — Fitch, Even, Tabin & Flannery LLP

(57) ABSTRACT

A keyboard instrument includes a processor and a keyboard including first, second and third keys. The first key is associated with first section data corresponding to a first section among a plurality of sections in a piece of music, includes at least two notes and corresponds to a first period of the piece of music. The second key is associated with second section data corresponding to a second section following the first section, includes at least two notes and corresponds to a second period of the piece of music. The third key is not associated with any section data. The processor displays an identifier such that the first and second keys are distinguishable from the third key, outputs the first section data as a musical sound when the first key is operated; and outputs the second section data as a musical sound when the second key is operated.

12 Claims, 17 Drawing Sheets

(56) References Cited

U.S. PATENT DOCUMENTS

| | | | | |
|---|---|---|---|---|
| 7,199,299 B2* | 4/2007 | Asakura | ............... | G09B 15/023 |
| | | | | 84/477 R |
| 7,750,228 B2* | 7/2010 | Fujishima | ................ | G10H 1/14 |
| | | | | 84/615 |
| 9,018,505 B2* | 4/2015 | Okuda | ..................... | G10H 1/38 |
| | | | | 84/613 |
| 10,304,430 B2* | 5/2019 | Nakamura | ........... | G10H 1/0008 |
| 2005/0016364 A1* | 1/2005 | Kamiya | ............... | G10H 1/0041 |
| | | | | 84/627 |
| 2019/0198001 A1* | 6/2019 | Danjyo | .................. | G10H 1/344 |

FOREIGN PATENT DOCUMENTS

| | | |
|---|---|---|
| JP | 2009-031822 A | 2/2009 |
| JP | 2017-125911 A | 7/2017 |

* cited by examiner

KEYBOARD INSTRUMENT AND METHOD

CROSS-REFERENCE TO RELATED APPLICATIONS

This application is based on and claims priority under 35 USC 119 from Japanese Patent Application No. 2017-248278 filed on Dec. 25, 2017, the contents of which are incorporated herein by reference

TECHNICAL FIELD

The present invention relates to a keyboard instrument and a method.

BACKGROUND ART

In the related art, there are known electronic keyboards having light emitting keys. Some of such electronic keyboards have various lesson functions for practicing music.
[Patent Literature 1] JP-A-2017-125911
When a user plays a track on a keyboard instrument, the user may want to play only a section of the track (for example, a well-known section or an impressive section of the track). However, it has been difficult to designate only a section of a track and play it on a keyboard instrument.

SUMMARY OF INVENTION

A keyboard instrument includes a keyboard and at least one processor. The keyboard includes a first key specifying a first pitch, a second key specifying a second pitch and a third key specifying a third pitch, when operated. The first key is associated with first section data corresponding to a first section among a plurality of sections in a piece of music. The first section data includes at least two notes and corresponds to a first period from a first timing to a second timing of the piece of music. The second key is associated with second section data corresponding to a second section following the first section among the plurality of sections in the piece of music. The second section data includes at least two notes and corresponds to a second period from the second timing to a third timing of the piece of music. The third key is not associated with any section data corresponding to any section among the plurality of sections in the piece of music. The at least one processor is electrically connected to the keyboard. The at least one processor is configured to: display at least one identifier such that the first key and the second key are distinguishable from the third key; output the first section data as a musical sound when the first key is operated; and output the second section data as a musical sound when the second key is operated.

DESCRIPTION OF EMBODIMENTS

Hereinafter, embodied forms (hereinafter, also referred to as embodiments) according to an aspect of the present invention will be described based on the drawings. However, the embodiments to be described below are merely examples of the present invention in every respect. It will be obvious that it is possible to make various modifications and variations without departing from the scope of the present invention. In other words, on the occasion of carrying out the present invention, specific configurations according to the embodiments may be appropriately be adopted. Also, in the embodiments, data to be registered is described in a natural language. More specifically, data can be described using a quasi-language, commands, parameters, a machine language, and so on which can be recognized by computers.

<1> First Embodiment

Figure 1:
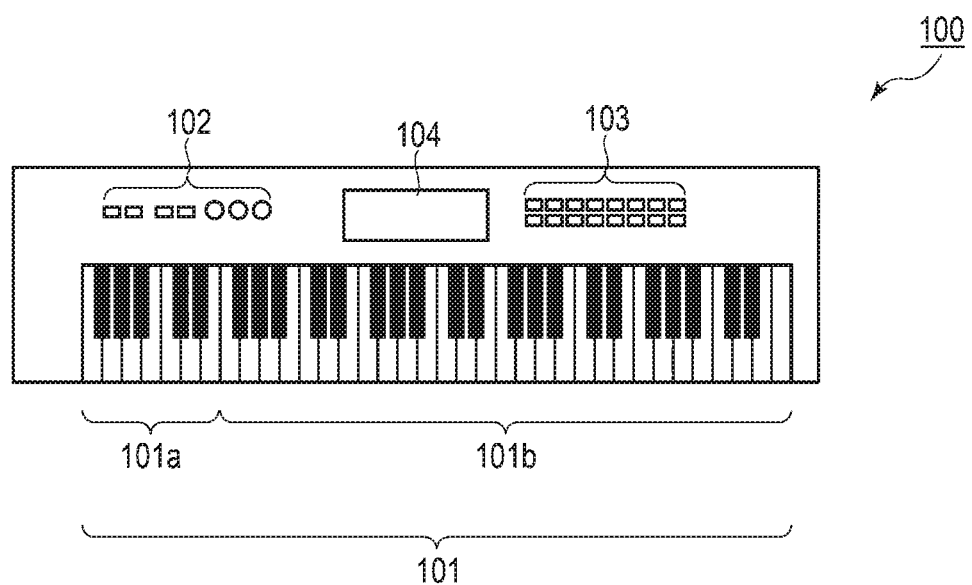
FIG. 1 is a view illustrating the external appearance of an electronic keyboard instrument.

<1-1> Electronic Keyboard Instrument 100
Hereinafter, an electronic keyboard instrument according to an embodiment will be described with reference to FIG. 1 and FIG. 2.
FIG. 1 is a view illustrating the external appearance of an electronic keyboard instrument (device) 100.
As shown in FIG. 1, the electronic keyboard instrument 100 includes a keyboard 101, a first switch panel 102, a second switch panel 103, and a liquid crystal display (LCD) 104. The keyboard 101 is composed of a plurality of keys serving as playing operation elements for designating notes, and the individual keys have a function of lighting up. The keyboard 101 has a plurality of white keys and a plurality of black keys. The plurality of white keys includes a first key specifying a first pitch, a second key specifying a second pitch, and a third key specifying a third pitch. The second pitch is higher than the first pitch, and the second key is next to the first key. The first key and the second key include light sources respectively. The first key and the second key are associated with individual music section data items, respectively. Specifically, the first key is associated with first section data corresponding to a first section among a plurality of sections in a piece of music. The first section data includes at least two notes and corresponds to a first period from a first timing to a second timing of the piece of music.

The second key is associated with second section data corresponding to a second section following the first section among the plurality of sections in the piece of music. The second section data includes at least two notes and corresponds to a second period from the second timing to a third timing of the piece of music. The third key is not associated with any music section data item corresponding to any section among the plurality of sections in the piece of music. If the first key or the second key is depressed (operated), the music section data item associated with the depressed (operated) key is played. If a black key is depressed when the music section data item is being played, play of the music section data item is interrupted or ended. In other words, the first section data is outputted as a musical sound when the first key is operated. The second section data is outputted as a musical sound when the second key is operated. In a first example, the music section data item associated with the first key is a music section data item on a first section (for example, a verse part) among a plurality of sections included in a track data item, and the music section data item associated with the second key is a music section data item on a second section (for example, a chorus part) among the plurality of sections included in the track data item. In a second example, the music section data item associated with the first key is a music section data item on a section (for example, a chorus part) included in a first-section data item of a plurality of track data items, and the music section data item associated with the second key is a music section data item on a section (for example, a chorus part) included in a second-section data item of the plurality of track data items. The first switch panel 102 instructs a variety of settings such as volume designation, setting of a tempo for automatic playing, and automatic playing start. The second switch panel 103 performs selection of a lessen mode for lessons according to the present embodiment, selection of a track to be automatically played, tone selection, and so on. The LCD 104 functions as a display unit for displaying lyrics during automatic playing and displaying a variety of information. Also, the electronic keyboard instrument 100 has a speaker (a sound outputting unit) (not shown especially in the drawings) for outputting musical sound generated by playing, on the bottom surface, the side surface, the back surface, or the like.

Figure 2:
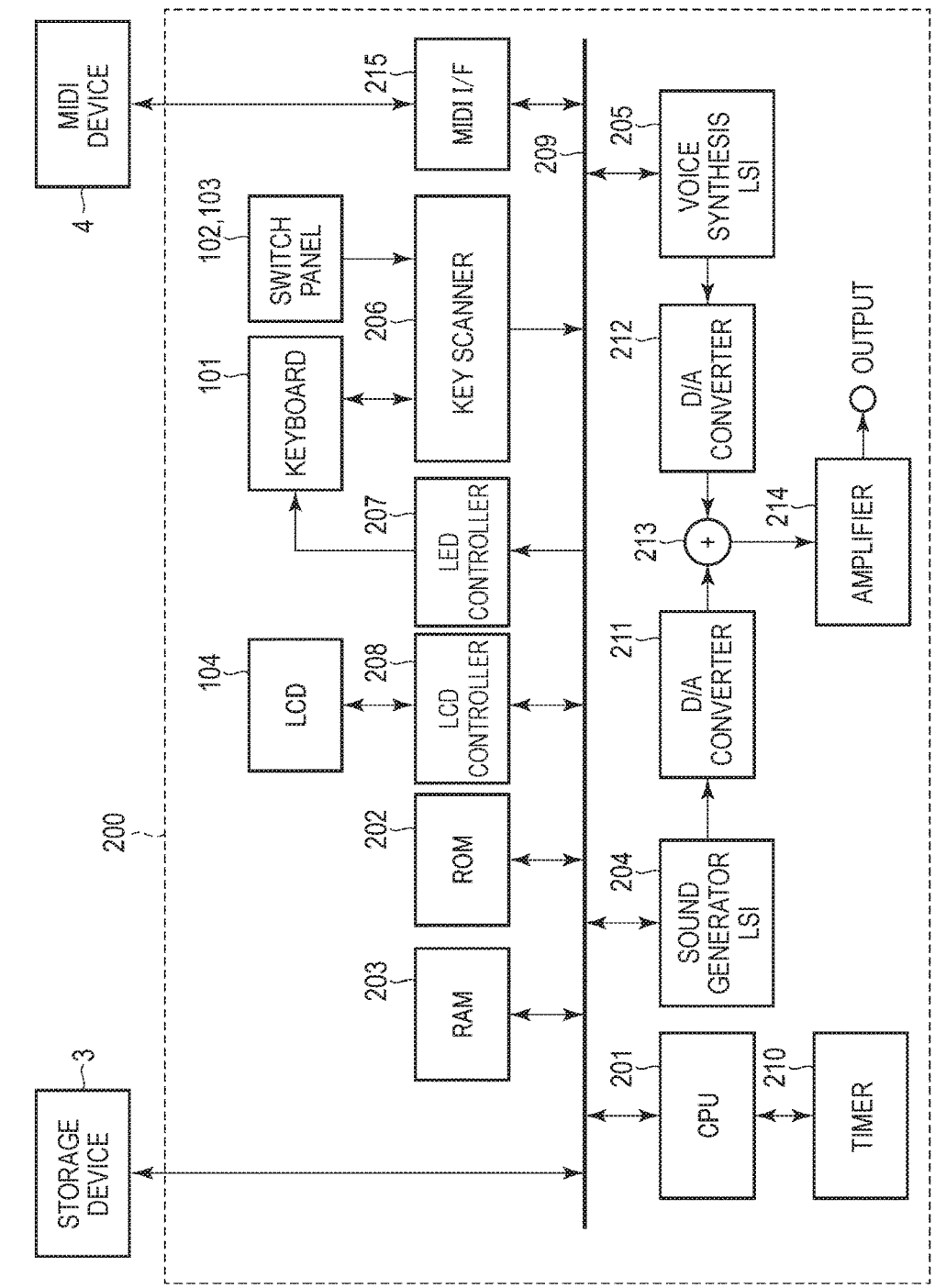
FIG. 2 is a view illustrating hardware of a control system of the electronic keyboard instrument.

FIG. 2 is a view illustrating hardware of a control system 200 of the electronic keyboard instrument 100 according to the embodiment. As shown in FIG. 2, the control system 200 includes the keyboard 101, the first switch panel 102, the second switch panel 103, a central processing unit (CPU) 201, which is a processor, a read only memory (ROM) 202, a random access memory (RAM) 203, a sound source LSI (Large Scale Integration) 204, a voice synthesis LSI 205, a key scanner 206, an LED (Light Emitting Diode) controller 207, an LCD controller 208, a system bus 209, a timer 210, a digital-to-analog (D/A) converter 211, a D/A converter 212, a mixer 213, an amplifier 214, and a MIDI interface (I/F) 215. The central processing unit (CPU) 201 (processor) is electrically connected to the keyboard 101.

Each of the CPU 201, the ROM 202, the RAM 203, the sound source LSI 204, the voice synthesis LSI 205, the key scanner 206, the LED controller 207, the LCD controller 208, and the MIDI I/F 215 are connected to the system bus 209.

The CPU 201 functions as a control unit of the electronic keyboard instrument 100. Specifically, the CPU 201 executes a control program stored in the ROM 202 while using the RAM 203 as a work memory, thereby performing the control operation of the electronic keyboard instrument 100. Hereinafter, for ease of explanation, even in the case where the control program is the subject of an operation, the CPU 201 will be written as the subject.

Also, the CPU 201 is connected to the timer 210 which is used to control the sequence of automatic playing.

The ROM 202 stores the control program, a variety of fixed data, automatic-playing-track data items, and so on for performing processes according to the present invention. Each automatic-playing-track data item includes a phrase data item which can be played by players, and an accompaniment track data item. Melody data items include information on the notes and information on the sound output timings of the notes. Accompaniment track data items are not limited to accompaniment tracks corresponding to melody data items, and may be data items on singing voices, the voices of people, and so on.

Sound output timings of individual notes may be the sound output intervals between the individual notes, or may be elapsed times from start of each automatic playing track. Also, as the unit of time, a time based on a tempo called a tick which is used in general sequencers is used. For example, in the case where the resolution of a sequencer is 480, 1/480 of the duration of a quarter note is 1 tick. Also, automatic-playing-track data items are not limited to the case where they are stored in the ROM 202, and may be stored in an information storage device or an information storage medium (not shown in the drawings).

Also, automatic-playing-track data items may have a format based on a file format for MIDI.

The sound source LSI 204 reads musical-sound waveform data from a waveform ROM (not shown in the drawings), and outputs the read data as digital musical-sound waveform data to the D/A converter 211. The sound source LSI 204 has a capability of generating 256 voices simultaneously.

If the voice synthesis LSI 205 receives the text data of a lyric, notes, and note durations, it synthesizes singing-voice data corresponding to the received data, and outputs the synthesized voice data as digital singing-voice data to the D/A converter 212.

The digital musical-sound waveform data which is output from the sound source LSI 204 is converted into analog musical-sound waveform signal by the D/A converter 211. Also, the digital singing-voice data which is output from the voice synthesis LSI 205 is converted into an analog singing-voice signal by the D/A converter 212. The analog musical-sound waveform signal and the analog singing-voice signal are mixed in the mixer 213. The mixed signal is amplified by the amplifier 214, and then is output from the speaker or an output terminal (not shown in the drawings).

The key scanner 206 regularly monitors the depressed/released state of the keyboard 101 and the switch operation states of the first switch panel 102 and the second switch panel 103. Also, the key scanner 206 notifies the states of the keyboard 101, the first switch panel 102, and the second switch panel 103 to the CPU 201.

The LED controller 207 is an integrated circuit (IC) for controlling the keys of the keyboard 101 in response to instructions from the CPU 201 such that the keys light up to navigate player's practicing.

The LCD controller 208 is an IC for controlling the display state of the LCD 104.

The MIDI I/F 215 receives MIDI messages (such as playing data items) from external devices such as a MIDI device 4, and outputs MIDI messages to external devices. According to the received MIDI messages, the sounds of sound sources are output.

Also, an external storage unit 3 may be connected to the system bus 209. Examples of the storage unit 3 include a flexible disk drive (FDD), a hard disk drive (HDD), a CD-ROM drive, a magneto optic disk (MO) drive, and so on. In the case where the control program is not in the ROM 202, it is possible to store the control program in the storage unit 3 in advance and read the control program into the RAM 203, such that the CPU 201 can perform the same operation as that in the case where the control program is in the ROM 202. Also, the electronic keyboard instrument 100 receives MIDI data files from the external storage unit 3, and transmits MIDI data files to the external storage unit 3.

However, the electronic keyboard instrument 100 may receive MIDI data files from external devices and transmits MIDI data files to external devices, using a USB interface (not shown in the drawings).

<1-2> Midi Data Files

In the present embodiment, the case of using MIDI data files as examples of track data items which are played on the electronic keyboard instrument 100 will be described.

Figure 3:
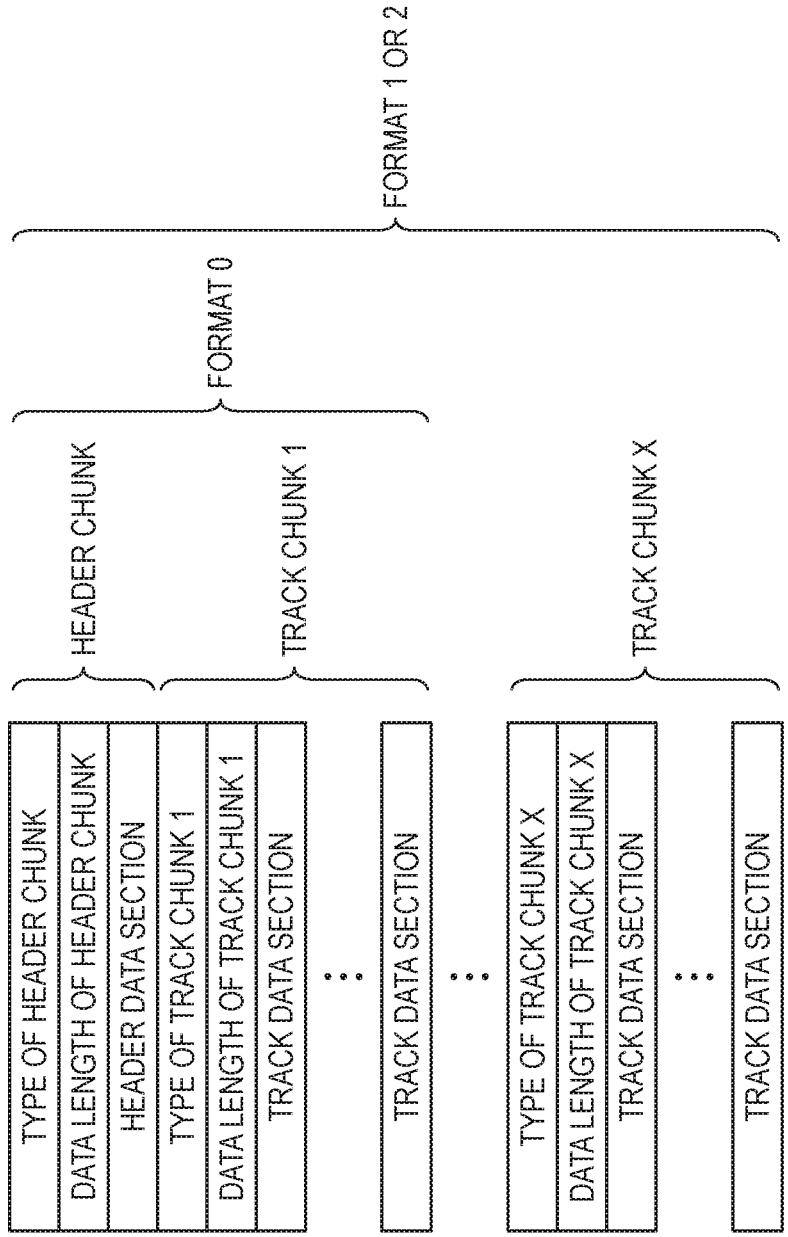
FIG. 3 is a view illustrating the configurations of MIDI data files.

With reference to FIG. 3, the configurations of MIDI data files will be described. Herein, standard MIDI files (SMFs) will be described. By the way, the main object of SMFs is to obtain interchangeability of playing data. SMFs makes it possible for each of different device models or different pieces of software to use MIDI data files including time information of the others.

Each SMF is composed of a plurality of blocks. Such blocks are called chunks. SMFs are basically composed of two types of chunks, i.e. header chunks and track chunks. The header chunk of each SMF includes information on the entire SMF, and each track chunk can include time MIDI data files for up to 16 channels.

Every SMF is configured to start with one header chunk which is followed by one or more track chunks.

<1-2-1> Formats

SMFs are classified into three formats (Format 0, Format 1, and Format 2) in terms of different chunk structures to be described below.

Format 0 is composed of one header chunk and one track chunk. Format 0 is a format which is configured by merging information for all channels into one track chunk.

Format 1 is composed of one header chunk and a plurality of track chunks. Format 1 is configured with a plurality of track chunks to be played simultaneously. In other words, Format 1 is a format which is configured by binarizing track chunks and combining them in a sequential order.

Format 2 is composed of one header chunk and a plurality of track chunks. Format 2 is used in the case of saving pattern information such that it possible to play while switching patterns, and so on.

<1-2-2> Header Chunk

A SMF starts with a header chunk which includes basic information on the entire MIDI data file. The header chunk includes a header-chunk type section, a header-chunk data length section, and a header data section arranged in the order.

<1-2-2-1> Header-Chunk Type Section

The header-chunk type section represents the type of chunks starting with the corresponding chunk.

<1-2-2-2> Header-Chunk Data Length

The header-chunk data length section represents the length of the MIDI data file except for the lengths of the chunk type section and the header-chunk data length section.

<1-2-2-3> Header Data Section

The header data section includes information on the SMF format, the number of tracks, and the unit of time.

The SMF format information represents one of Format 0, Format 1, and Format 2 which is the format of the SMF.

The information on the number of tracks represents the number of track chunks included in the MIDI data file.

For SMFs, there are two kinds of format in units of time. One of them uses a relative time which is a time for musical notation, and the other uses an absolute time corresponding to a time code. As the unit of time, one of the two types can be designated.

<1-2-3> Track Chunks

In each track chunk, data on actual playing sound is included. Each track chunk includes a track-chunk type section, a track-chunk data length section, and track data sections arranged in the order.

<1-2-3-1> Track-Chunk Type Section

The track-chunk type section represents the type of chunks starting with the corresponding chunk.

<1-2-3-2> Track-Chunk Data Length Section

Similarly to the header-chunk data length section, the track-chunk data length section reprograms the length of subsequent data.

<1-2-3-3> Track Data Section

Each track data section includes delta-time information and event information. Each track chunk includes a plurality of track data sections.

Figure 4:
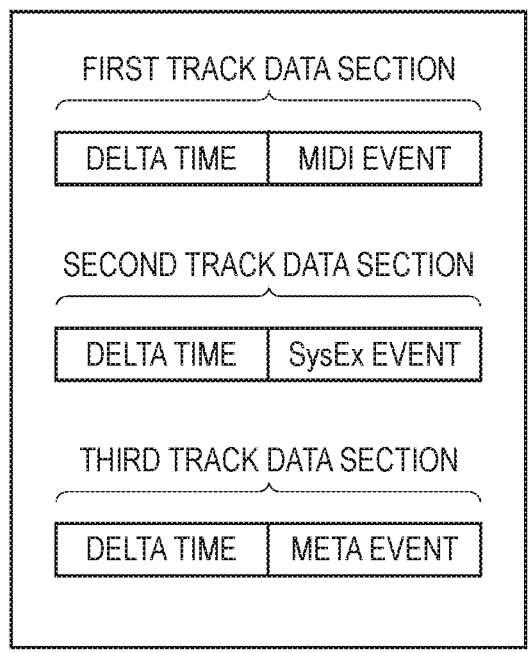
FIG. 4 is a view illustrating the configurations of track data sections.

With reference to FIG. 4, details of track data sections will be described.

As shown in FIG. 4, track data sections are classified into three types (first to third track data sections).

Each first track data section is composed of delta-time information and MIDI event information.

Each second track data section is composed of delta-time information and SysEx event information.

Each third track data section is composed of delta-time information and meta-event information.

<1-2-3-3-1> Delta-Time Information

In order to express one event, delta-time information is set. Delta-time information is expressed by variable-length numeric-value expression, and is time information representing the time till the next event. The delta-time information depends on the unit of time set in the header chunk. For example, in order to start the first event of a track chunk at the same time as start of the track chunk, or in order to perform two events simultaneously, a delta time of zero is used.

<1-2-3-3-2> MIDI Event Information

The meta-event information is a MIDI channel message.

As specific examples of MIDI channel messages, there are messages such as "Note-On", "Note-Off", "Controller Change", and "Program Change".

<1-2-3-3-3> SysEx Event Information

SysEx event information is used for designating a MIDI system exclusive message. SysEx event information is different from meta-event information in that it includes a status bite followed by variable-length data.

<1-2-3-3-4> Meta-Event Information

Meta-event information is used to store information (such as a tempo, a track title, and so on) without playing-sound data, convenient for sequencers and SMFs. Meta-event information is configured to start with a status bite ff which is followed by a bite representing an event type, information on the length of data stored in the variable-length format, and the data in the order. Hereinafter, each of specific examples of meta-event information is described in the format having the sequence of a status byte, a byte representing an event type, data length information, and data.

Specific examples of meta-event information include text information, copyright display information, sequence name information, musical instrument name information, lyric information, maker information, cue point information, program name (tone name) information, device name (sound source name) information, track end information, tempo setting information, beat information, and so on.

Specifically, meta-event information representing a marker is described in the format "ff 06 len text". Meta-event information representing a maker is used to describe the name of a part of a sequence at that moment, like rehearsal marks or a section name.

<1-3> Track Configuration

The electronic keyboard instrument 100 according to the present embodiment can visually display specific parts of tracks. Prior to a description of a method of visually displaying a specific part of a track, the configurations of tracks will be described.

Each track can be considered as a period of time. Also, the period can be divided into a plurality of sections. In other words, each track includes a plurality of sections arranged in chronological order. In other words, each track data item includes a plurality of section data items. Track data items are data items which can be played such that the sounds of the tracks are output by the sound outputting unit. Section data items mean data items on the musical sounds of sections. Also, a section data item means a group of track data sections from a track data section representing a certain section before a track data section representing the next section.

Examples of sections include intro sections, A phrase sections, B phrase sections, motif sections, outro sections, and so on.

Each intro section is the introduction section of a track.

Each A phrase section is the first melody section of a track.

Each B phrase section is the next melody section of an A phrase.

Each motif section is the highlight section of a track referred to as the idea of the track.

Each outro section is the postlude section of a track.

A phrases are also referred to as A verses. Also, B phrases are also referred to as B verses or bridges. A bridge means a section which is inserted between A phrase and a motif. Also, a motif is also referred to as a chorus or a C verse. Also, an outro is also referred to as an ending.

Figure 5:
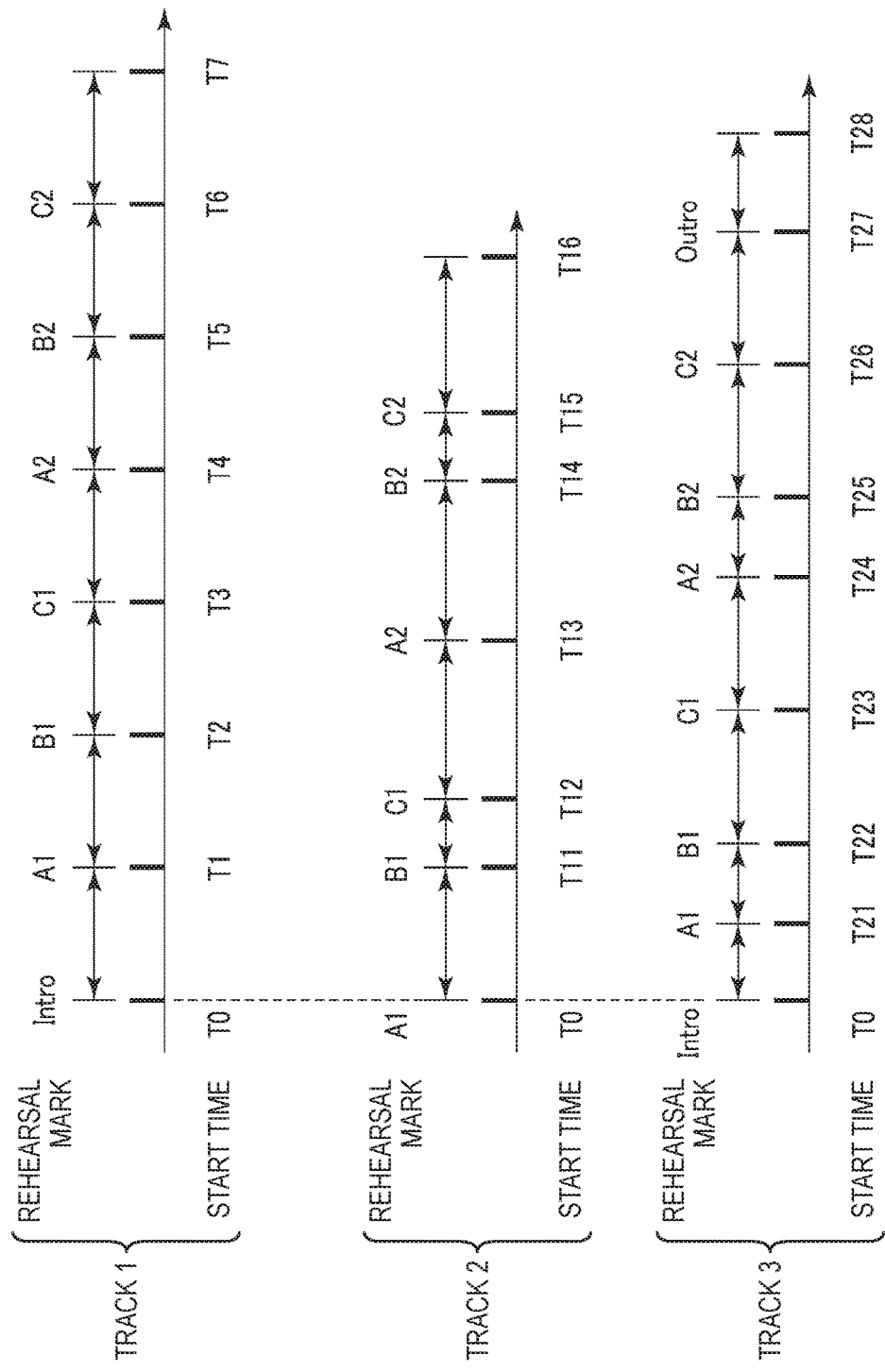
FIG. 5 is a view illustrating the configurations of tracks.

Specific examples of the configurations of tracks will be described with reference to FIG. 5. In FIG. 5, three tracks, i.e. first to third tracks are shown as examples. Also, in FIG. 5, rehearsal marks representing sections of the tracks and the start times of the sections are shown. Information items on the rehearsal marks are described in meta-event information items representing the makers of the MIDI data files. The start times of the sections are described in delta-time information items which are included in the meta-event information items.

Each of the tracks is composed of a plurality of sections as described above. However, the configurations of the tracks are different from one another, and the playing times of the tracks are also different from one another.

As shown in FIG. 5, the first track has sections such as an intro, a first A phrase (A1), a first B phrase (B1), a first motif (C1), a second A phrase (A2), a second B phrase (B2), and a second motif (C2) arranged in the order.

The second track has sections such as a first A phrase (A1), a first B phrase (B1), a first motif (C1), a second A phrase (A2), a second B phrase (B2), and a second motif (C2) arranged in the order.

The third track has sections such as an intro (Intro), a first B phrase (B1), a first motif (C1), a second A phrase (A2), a second B phrase (B2), a second motif (C2), and an outro (Outro) arranged in the order.

As described above, the first to third tracks have the different track configurations. Also, as shown in FIG. 5, the first to third tracks have the same track start time (T0), but are different from one another in the start times of the individual sections. There are devices on which it is impossible to select a section of a track, and a user may want to listen a motif of the first track on such a device. However, in this case, it is difficult for the user to immediately play the motif of the first track.

<1-4> Outline

For this reason, in the present invention, a method of quickly playing a desired section of a track will be described.

In the present embodiment, white keys in a specific key range of the electronic keyboard instrument are considered as being arranged on the time axis and being equivalent to a seek bar of a music player application or the like. Further, information items on sections of a track (rehearsal marks and the start times of the sections) are assigned to the white keys in the specific key range, such that it is possible to recognize the sections of the track such as a motif part at a glance based on the differences in luminance level between the light emitting keys.

As described above, a MIDI data file on a track includes information on rehearsal marks representing sections, and delta-time information representing the start times of the sections. On the occasion of playing the MIDI data file, the CPU 201 extracts meta-event information including the rehearsal mark information, and delta-time information associated with the meta-event information. Therefore, the CPU 201 can grasp the rehearsal marks and the start times of the rehearsal marks from the extracted meta-event information and the extracted delta-time information. Subsequently, the CPU 11 assigns the rehearsal marks to white keys of keys 101a in the order of the start times.

By the way, in the present embodiment, the luminance level of keys associated with the rehearsal marks Cn (n is an arbitrary number) corresponding to motifs when the keys emit light is set to be different from the luminance level of the other keys when the keys emit light. Therefore, the user can quickly determine the keys associated with the motifs based on the luminance levels of the keys. In the first embodiment, for example, the luminance level of the white keys associated with the motifs is higher than the luminance level of the white keys associated with sections other than the motifs.

The information items on the assignment of the sections to the keys and the information items on the luminance levels of the keys are stored as track configuration information items in association with the tracks, for example, in the RAM 203 or the like. If the user selects a track to be played, the CPU 201 reads a track configuration information item on the selected track, from the RAM 203 or the like. The LED controller 207 makes the keys 101a emit light based on the track configuration information item.

Then, the user depresses (designates) a key associated with a rehearsal mark. The CPU 201 plays the track from the section assigned to the key designated by the user. More specifically, the CPU 201 controls the sound outputting unit such that the sound outputting unit outputs a sound based on the track data section related to the start time (delta time) assigned to the key designated by the user.

Hereinafter, specific examples of the method of assigning a track to the keyboard will be described.

<1-4-1> Example of Assignment of First Track

Figure 6:
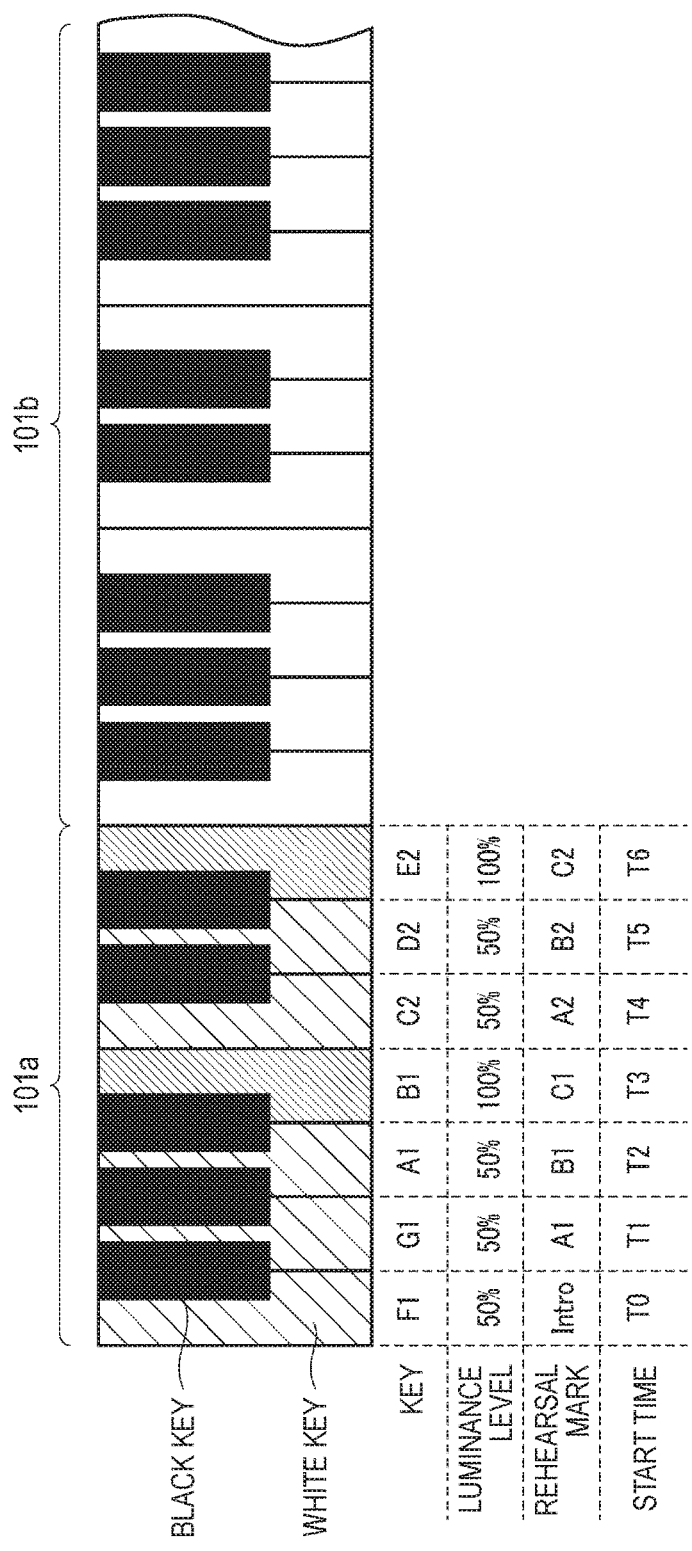
FIG. 6 is a view illustrating assignment of a track to a keyboard.

With reference to FIG. 6, an example of assignment of the first track will be described. FIG. 6 shows the relation of rehearsal marks assigned to the notes of the keys, the start times, and the luminance levels when the keys emit light.

As shown in FIG. 6, the CPU 201 assigns the individual sections of the first track to white keys in the order of the start times. Specifically, the CPU assigns the intro, the first A phrase (A1), the first B phrase (B1), the first motif (C1), the second A phrase (A2), the second B phrase (B2), and the second motif (C2) to white keys having the note F1, the note G1, the note A1, the note B1, the note C2, the note D2, and the note E2, respectively.

Further, the CPU 201 sets, for example, a luminance level of 50% for the white keys associated with the rehearsal marks representing the sections other than the motifs, and sets, for example, a luminance level of 100% for the white keys associated with the rehearsal marks representing the motifs. However, the luminance levels may be arbitrarily changed.

In the example of FIG. 6, for example, the user designates the key having the note B1. In this case, the CPU 201 plays the MIDI data file from the section (whose start time is T3) of the rehearsal mark C1 assigned to the designated key having the note B1.

Also, a table shown in FIG. 6 is, for example, a track configuration information item, and is stored in, for example, the RAM 203 or the like.

<1-4-2> Example of Assignment of Second Track

Figure 7:
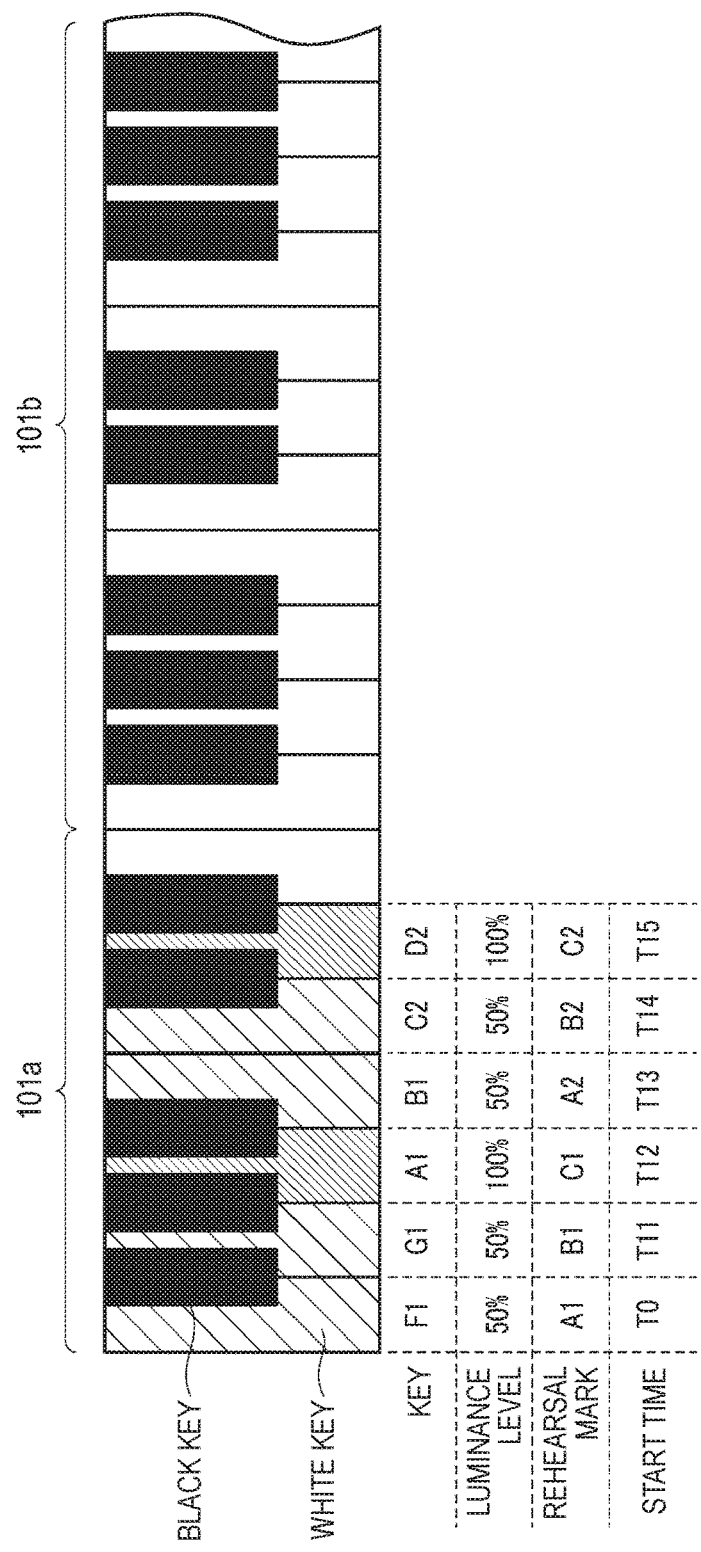
FIG. 7 is a view illustrating assignment of a track to the keyboard.

With reference to FIG. 7, an example of assignment of the second track will be described. FIG. 7 shows the relation of rehearsal marks assigned to the notes of the keys, the start times, and the luminance levels when the keys emit light.

As shown in FIG. 7, the CPU 201 assigns the individual sections of the second track to white keys in the order of the start times. Specifically, the CPU assigns the first A phrase (A1), the first B phrase (B1), the first motif (C1), the second A phrase (A2), the second B phrase (B2), and the second motif (C2) to white keys having the note F1, the note G1, the note A1, the note B1, the note C2, and the note D2, respectively.

Further, the CPU 201 sets, for example, a luminance level of 50% for the white keys associated with the rehearsal marks representing the sections other than the motifs, and sets, for example, a luminance level of 100% for the white keys associated with the rehearsal marks representing the motifs. However, the luminance levels may be arbitrarily changed.

In the example of FIG. 7, for example, the user designates the key having the note A1. In this case, the CPU 201 plays the MIDI data file from the section (whose start time is T12) of the rehearsal mark C1 assigned to the designated key having the note A1.

Also, a table shown in FIG. 7 is, for example, a track configuration information item, and is stored in, for example, the RAM 203 or the like.

<1-5> Operations

The electronic keyboard instrument 100 according to the present embodiment displays the sections of a track on the keyboard. The user can easily play a desired section by just designating a key. Now, operations of the electronic keyboard instrument 100 for playing a track data item will be described with reference to FIG. 8.

[Step S1001]

If the user selects a track by the first switch panel 102 or the second switch panel 103, the electronic keyboard instrument 100 performs a track start process. Specifically, if the user designates a track by the first switch panel 102 or the second switch panel 103, the key scanner 206 notifies the CPU 201 that the track has been selected. If receiving the notification representing that the specific track has been selected, from the key scanner 206, the CPU 201 performs a track start process.

As the track start process, the CPU 201 refers to a track configuration information item stored in association with the selected track, for example, in the RAM 203.

[Step S1002]

Based on the track configuration information item referred to in STEP S1001, the CPU 201 performs a display process of displaying the keys 101a such that the keys become distinguishable. Specifically, the CPU 201 displays at least one identifier such that the first key and the second key are distinguishable from the third key. The CPU 201 may display at least one identifier by lighting the light sources, such that the first key and the second key are lighted the third key is not lighted. The CPU 201 may display at least one identifier by lighting the light sources, such that the first key and the second key are lighted with different luminance levels respectively, and the third key is not lighted. The CPU 201 may display the at least one identifier by light the light sources, such that the first key and the second key are lighted, based on luminance information items associated with the plurality of sections, respectively.

Specifically, the CPU 201 controls the LED controller 207 such that, based on the track configuration information item (see FIG. 6 and FIG. 7), the LED controller makes the keys emit light with the luminance levels determined for the keys.

At this time, the CPU performs control such that the keys which are not associated with the sections do not emit light.

[Step S1003]

The CPU 201 performs a determining process of determining whether any one key of the plurality of bright keys (first operation elements) has been designated.

In the case where any one key of the plurality of bright keys has not been designated ("NO" in STEP S1003), the CPU 201 repeats STEP S1003.

[Step S1004]

In the case where a key of the plurality of bright keys has been designated ("YES" in STEP S1003), the CPU 201 performs a sound outputting process of outputting the musical sound of the section associated with the designated key.

Specifically, if the key scanner 206 determines that a key of the plurality of bright keys has been designated, it notifies the CPU 201 that the key has been designated. The CPU 201 controls the sound outputting unit such that the sound outputting unit outputs the musical sound based on the section associated with the designated key.

Also, if the user designates a specific key, the CPU 201 performs control such that the musical sounds of the sections arranged in chronological order are sequentially output to the end of the track.

[Step S1005]

The CPU 201 performs a flashing process of controlling the LED controller 207 such that the LED controller makes the key, associated with the section which is the object of sound output of STEP S1004, flash. As a result, the user can visually determine the section of the track whose sound is being output.

[Step S1006]

The CPU 201 performs a determining process of determining whether any one key of the plurality of bright keys has been designated. The electronic keyboard instrument 100 of the present embodiment can play an arbitrary section in the course of sound output.

In the case where a key of the plurality of bright keys has been designated ("YES" in STEP S1006), the CPU 201 performs STEP S1004.

[Step S1007]

In the case where any one key of the plurality of bright keys has not been designated ("NO" in STEP S1006), the CPU 201 performs a determining process of determining whether any one black key of the plurality of black keys has been designated.

However, black keys to be objects of the determining process of STEP S1007 can be appropriately changed. Examples of such black keys include black keys adjacent to the white keys corresponding to the section whose sound is being output, the black key having the note F1#, the black keys included in the keys 101a, and so on.

[Step S1008]

In the case where a black key of the plurality of black keys has been designated ("YES" in STEP S1007), the CPU 201 performs an interrupting process of interrupting the sound output of STEP S1004.

Specifically, if the key scanner 206 recognizes that a black key set as a black key for stopping track play, for example, the RAM 203 or the like has been depressed, it notifies CPU 201 that the key has been depressed. If receiving the notification, the CPU 201 interrupts play of the MIDI data file.

[Step S1009]

In the case where it is determined that any one black key of the plurality of black keys has not been designated ("NO" in STEP S1007), or after STEP S1008, the CPU 201 performs a determining process of determining whether the track has finished.

In the case where it is determined that the track has not finished ("NO" in STEP S1009), the CPU 201 performs STEP S1006.

[Step S1010]

In the case where it is determined that the track has finished ("YES" in STEP S1009), the CPU 201 performs a finishing process of finishing output of the sounds of the section data items.

<1-6> Effects

According to the above-described embodiment, the keyboard 101 has the keys (first operation elements) 101a associated with the section data items of the plurality of sections included in the track data item, and keys 101b (second operation elements) which are not associated with the section data items. The CPU 201 performs the display process of displaying the plurality of first operation elements such that they become distinguishable such that it is possible to designate a first operation element of the plurality of first operation elements in order to output a musical sound based on a section data item associated with the designated element.

The user may want to listen only a specific part of a track, such as a motif. In general, a track is played sequentially from the beginning. Therefore, the user needs to search for information on the specific part of the track and designate the corresponding part. However, on electronic musical instruments having no operation means like seek bars of music applications, it is troublesome to designate a specific part of a track, such as a motif, to be played.

According to the above-described embodiment, the light emitting keys are considered as being arranged on the horizontal time axis, and the sections of each track are assigned to the individual keys. Especially, in the above-described embodiment, the luminance levels of the keys associated with the sections of the track are different. Specifically, the luminance level of the keys associated with the motifs is higher. Therefore, the user can determine the positions of the keys associated with the motifs at a glance. According to this configuration, it is possible to visualize the sections of tracks without newly adding a dedicated display unit to the electronic keyboard instrument, such that the user can quickly select a desired section (such as a motif) of a track and play the corresponding section. Also, since it is possible to listen a desired part in a short time, it is easy to search for desired tracks from a lot of tracks. Even in the case where the user wants to repetitively play a specific part for a certain purpose, for example, for practicing a song, it is possible to quickly search for and play the corresponding part.

<1-7> First Modification

Now, a first modification of the first embodiment will be described with reference to FIG. 9.

In the first embodiment, the case where the luminance level of the white keys associated with the motifs is higher than the luminance level of the white keys associated with the other sections has been described. However, more luminance levels may be set.

Figure 9:
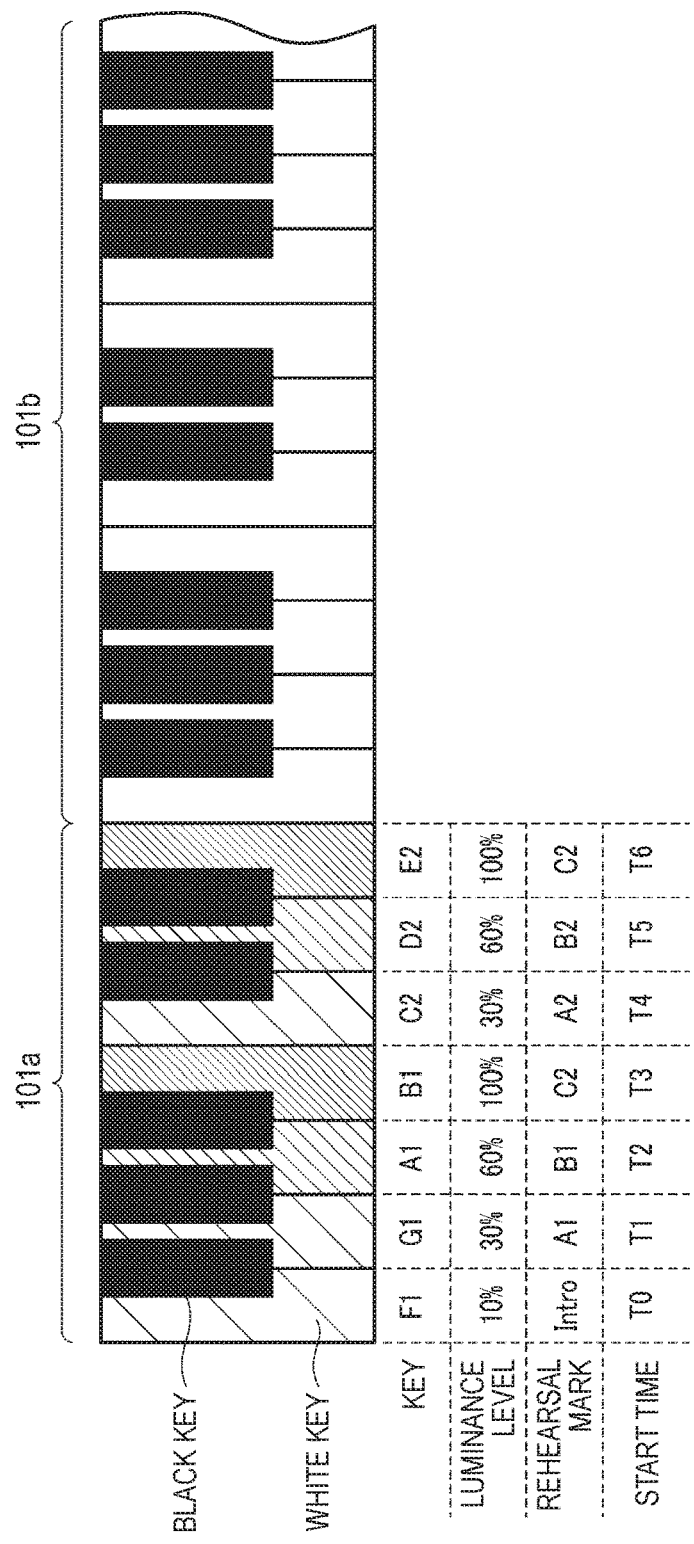
FIG. 9 is a view illustrating assignment of a track to the keyboard.

As a specific example, as shown in FIG. 9, for white keys associated with intros, a luminance level of 10% may be set, and for white keys associated with A phrases, a luminance level of 30% may be set, and for white keys associated with B phrases, a luminance level of 60% may be set, and for white keys associated with motifs, a luminance level of 100% may be set. The example of FIG. 9 is one example, and the user can arbitrarily change the luminance level settings.

<1-8> Second Modification

Now, a second modification of the first embodiment will be described with reference to FIG. 10.

In the first embodiment, when the electronic keyboard instrument 100 plays a track data item, if the user designates a specific key, the electronic keyboard instrument outputs the musical sounds of sections arranged in chronological order, to the end of the track. However, when playing a track data item, the electronic keyboard instrument 100 may output only the musical sound of a section designated by the user.

Figure 10:
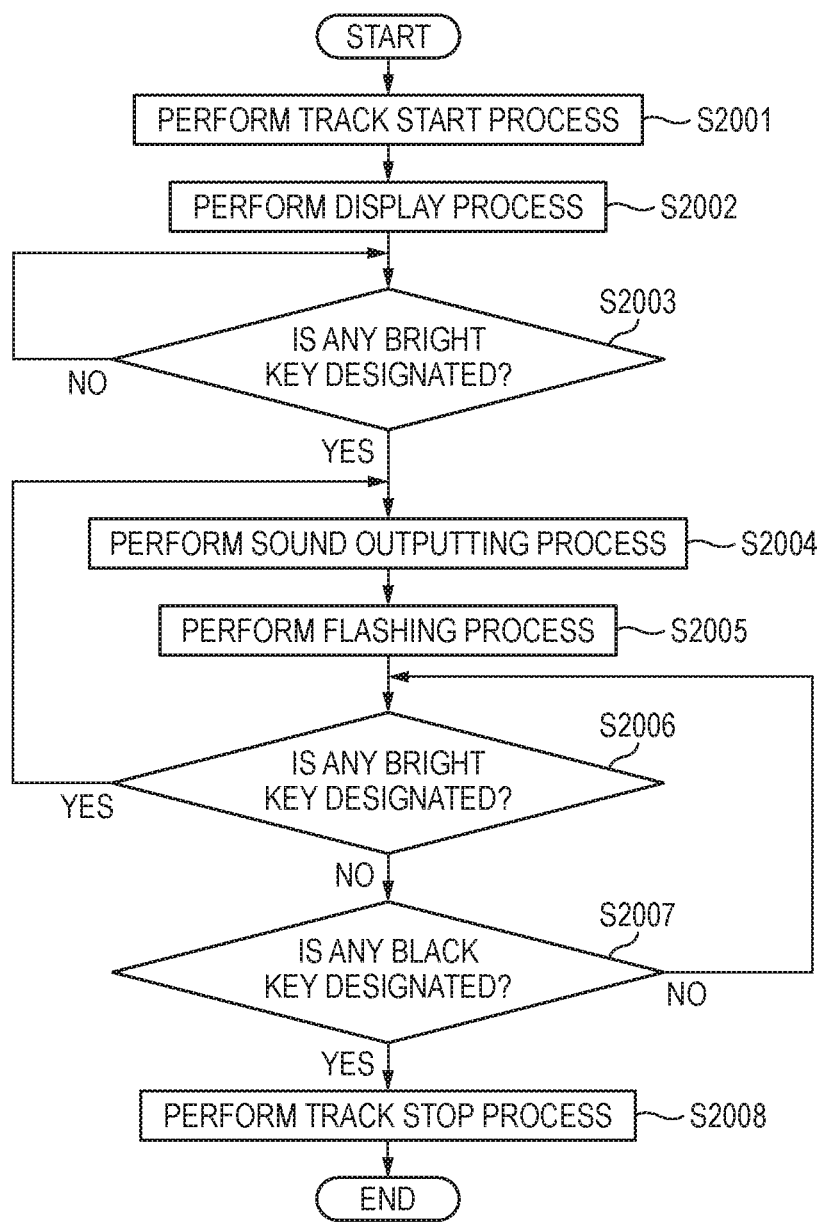
FIG. 10 is a flow chart illustrating operations of the electronic keyboard instrument.

Specifically, the electronic keyboard instrument performs operations as shown in FIG. 10.

[Step S2001] to [Step S2003]

Figure 8:
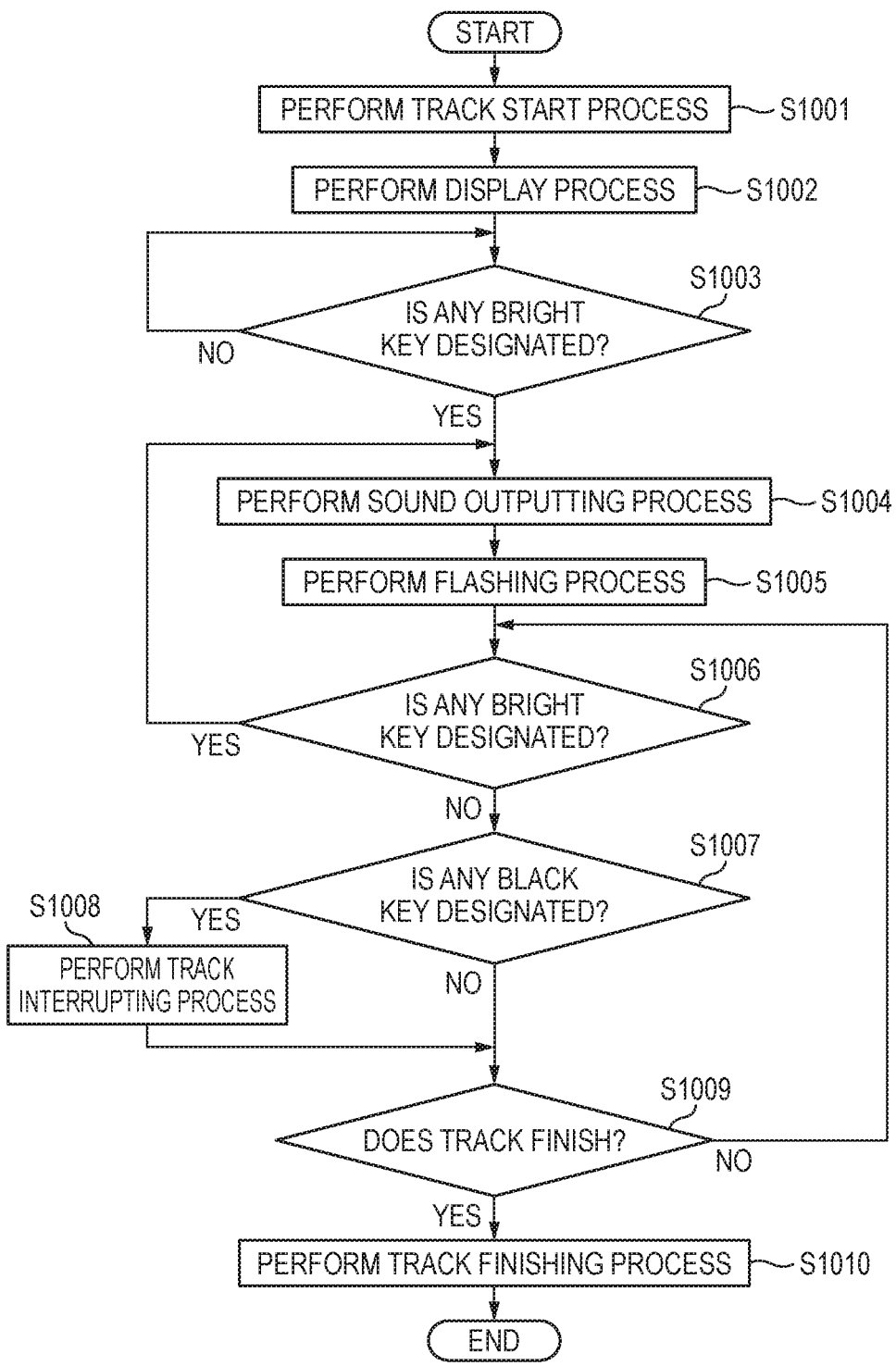
FIG. 8 is a flow chart illustrating operations of the electronic keyboard instrument.

The operations of STEP S2001 to STEP S2003 are identical to the operations of STEP S1001 to STEP S1003 described with reference to FIG. 8.

[Step S2004]

In the case where any one key of the plurality of bright keys has been designated ("YES" in STEP S2003), the CPU 11 performs a sound outputting process of outputting only the musical sound of the section associated with the designated key.

[Step S2005] and [Step S2006]

The operations of STEP S2005 and STEP S2006 are identical to the operations of STEP S1005 and STEP S1005 described with reference to FIG. 8.

[Step S2007]

In the case where any one key of the plurality of bright keys has not been designated ("NO" in STEP S2006), the CPU 201 performs a determining process of determining whether any one black key of the plurality of black keys has been designated.

In the case where it is determined that any one black key of the plurality of black keys has not been designated ("NO" in STEP S2007), the CPU 11 performs the operation of STEP S2006.

[Step S2008]

The operation of STEP S2008 is identical to the operation of STEP S1008 described with reference to FIG. 8.

As described above, when playing a track data item, the electronic keyboard instrument 100 can perform loop play (repetitive play) of a section designated by the user.

<2> Second Embodiment

A second embodiment will be described. In the first embodiment, the sections of a track is assigned to white keys and these keys are made emit light, such that the configuration of the track can be visually recognized. In the second embodiment, the case where only motifs of a plurality of tracks are assigned to white keys will be described. Also, the basic configuration and basic operations of an electronic keyboard instrument according to the second embodiment are the same as those of the electronic keyboard instrument according to the first embodiment described above. Therefore, a description of the points described in the first embodiment will not be made.

<2-1> Outline

In the present embodiment, section data items on motifs of a plurality of tracks (rehearsal marks and the start times of the sections) are assigned to white keys in a specific key range.

The CPU 11 extracts a set (track data sections) composed of rehearsal mark information items representing motifs of tracks and delta-time information items representing the start times of the motifs. Further, the CPU 201 assigns a predetermined number of tracks (or motifs of the individual tracks) to white keys of the keys 101*a* in an arbitrary order. In the present embodiment, for the keys associated with the motifs, different luminance levels are set, respectively. For example, the CPU 11 treats the plurality of tracks (the group of tracks) as one. For example, the track group is considered as being for a certain purpose, for example, for weddings or for children.

The information item on the assignment of the motifs to the keys and the information item on the luminance levels of the keys are stored as a track configuration information item in association with the tracks, for example, in the RAM 203 or the like. If the user selects a track group to be playing, the CPU 201 reads a track configuration information item on the selected track group, from the RAM 203 or the like. The LED controller 207 makes the keys 101*a* emit light, based on the track configuration information item.

Then, the user depresses (designates) a key associated with a motif. The CPU 201 plays the tracks from the motif assigned to the key designated by the user.

Hereinafter, specific examples of the method of assigning tracks to keys will be described.

<2-2> Example of Assignment of Motifs

Figure 11:
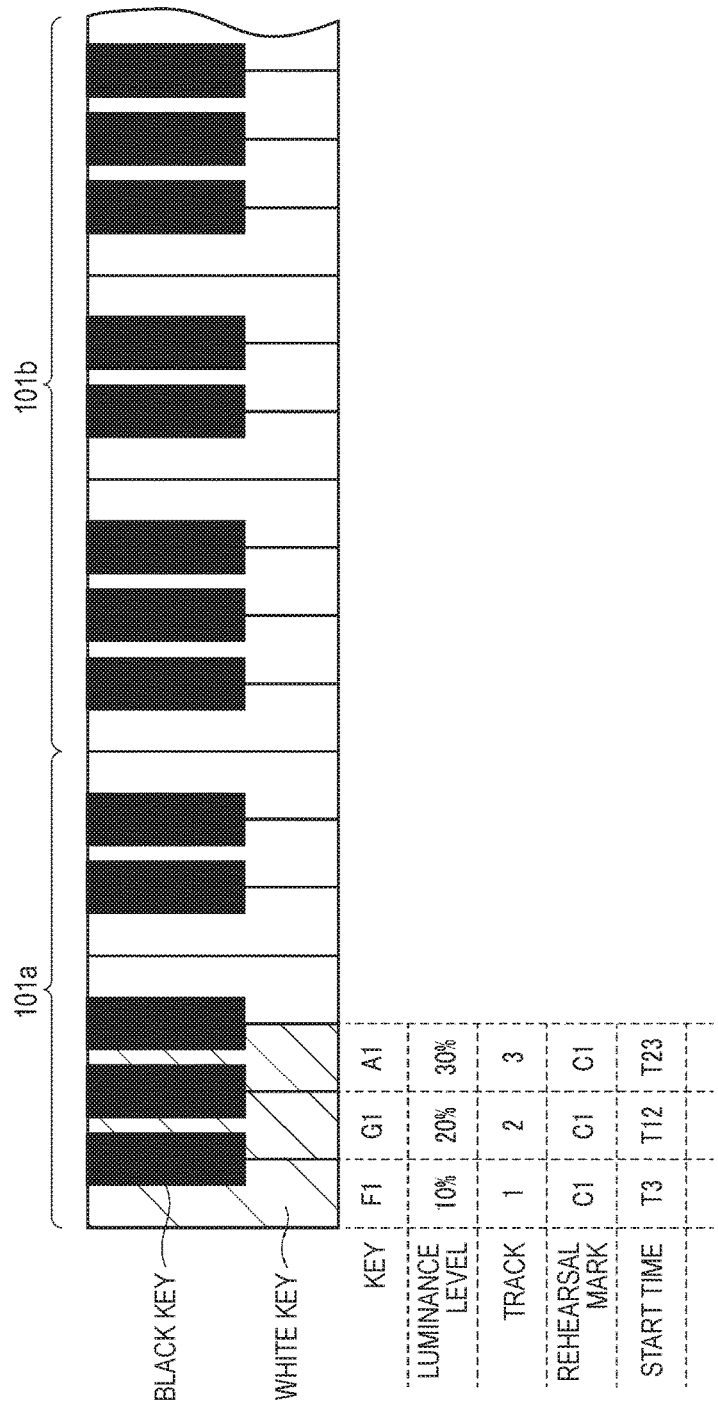
FIG. 11 is a view illustrating assignment of a track to the keyboard.

With reference to FIG. 11, an example of assignment of motifs will be described. FIG. 11 shows the relation of rehearsal marks assigned to the notes of the keys, the start times, and the luminance levels when the keys emit light.

As shown in FIG. 11, the CPU 201 assigns the motifs of the first to third tracks described with reference to FIG. 5 to keys (a plurality of white keys) in the order. Specifically, the CPU assigns a motif of the first track, a motif of the second track, and a motif of the third track to the white key having the note F1, the white key having the note G1, and the white key having the note A1, respectively.

Also, the CPU 201 sets, for example, a luminance level of 10% for the white key associated with the motif of the first track, and sets, for example, a luminance level of 20% for the white key associated with the motif of the second track, and sets, for example, a luminance level of 30% for the white key associated with the motif of the third track. However, the luminance levels may be arbitrarily changed.

In the example of FIG. 11, for example, the user designates the key having the note G1. In this case, the CPU 201 plays the MIDI data files from the motif of the second track (whose start time is T12) associated with the designated key having the note G1.

Also, a table shown in FIG. 11 is, for example, a track configuration information item, and is stored in, for example, the RAM 203 or the like.

<2-3> Operations

Figure 12:
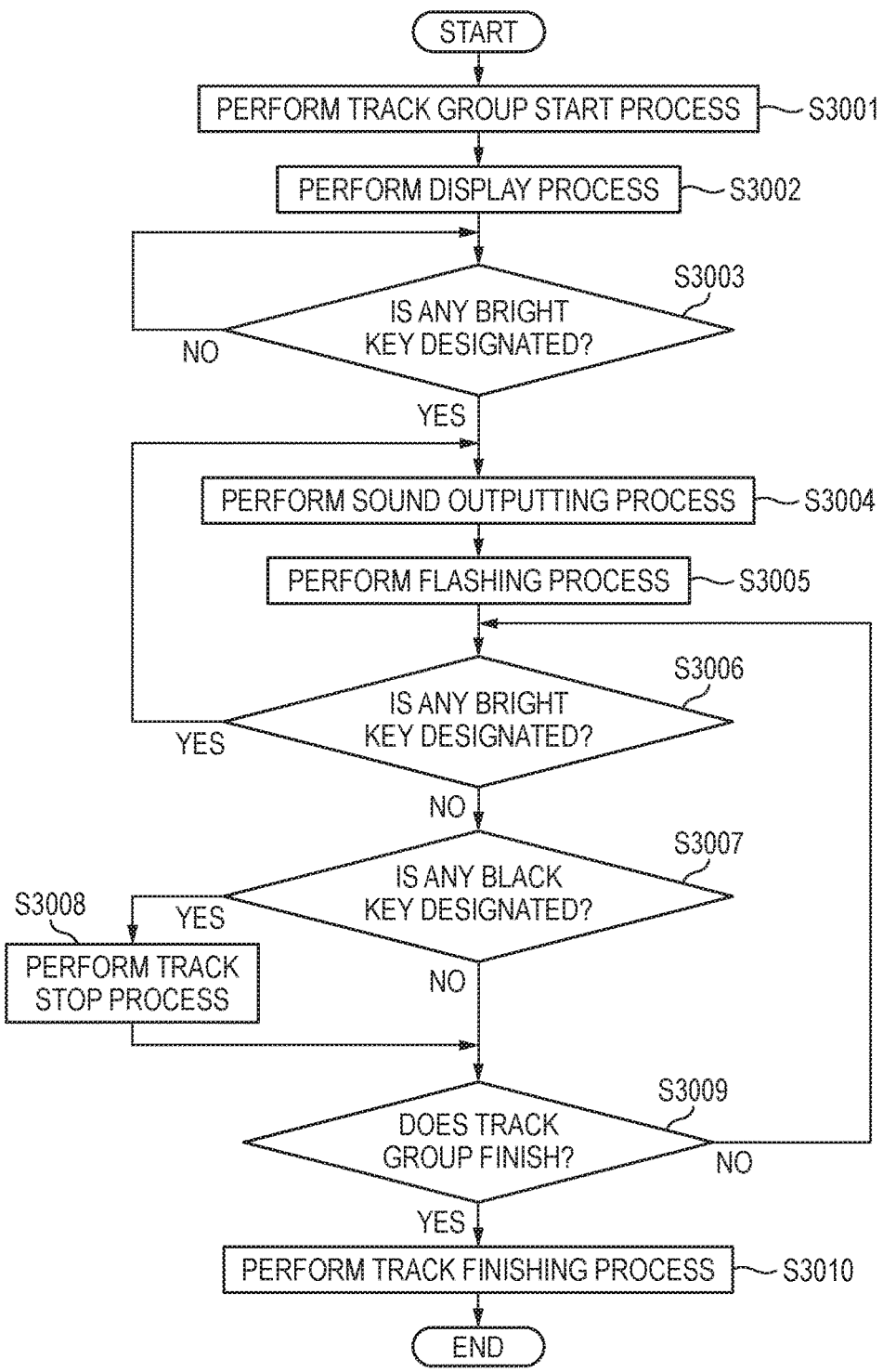
FIG. 12 is a flow chart illustrating operations of the electronic keyboard instrument.

The electronic keyboard instrument 100 according to the present embodiment displays only motifs of a plurality of tracks on the keyboard. The user can easily play the motif of a desired track by just designating a key. With reference to FIG. 12, operations of the electronic keyboard instrument 100 for playing track data items will be described.

[Step S3001]

If the user selects a track group by the first switch panel 102 or the second switch panel 103, the electronic keyboard instrument 100 performs a track-group start process. Specifically, if the user designates a track group by the first switch panel 102 or the second switch panel 103, the key scanner 206 notifies the CPU 201 that the track group has been selected. If receiving the notification representing that the specific track group has been selected, from the key scanner 206, the CPU 201 performs a track-group start process.

As the track-group start process, the CPU 201 refers to track configuration information items stored in association with the selected track group, for example, in the RAM 203.

[Step S3002]

Based on the track configuration information item referred to in STEP S3001, the CPU 201 performs a display process of displaying the keys 101*a* such that the keys become distinguishable.

Specifically, the CPU 201 controls the LED controller 207 such that, based on the track configuration information item (see FIG. 11), the LED controller makes the keys emit light with the luminance levels determined for the keys.

[Step S3003]

The operation of STEP S3003 is identical to the operation of STEP S1003 described with reference to FIG. 8.

[Step S3004]

In the case where a key of the plurality of bright keys has been designated ("YES" in STEP S3003), the CPU 201 performs a sound outputting process of outputting the musical sound of the motif of the track (a section data item) associated with the designated key.

Specifically, if the key scanner 206 determines that a key of the plurality of bright keys has been designated, it notifies the CPU 201 that the key has been designated. The CPU 201 controls the sound outputting unit such that the sound outputting unit outputs the musical sound based on the motif of the track associated with the designated key.

Also, if the user designates a specific key, the CPU 201 performs control such that the musical sounds from the motif of the designated track to the last motif of the track group are sequentially output.

[Step S3005] to [Step S3008]

The operations of STEP S3005 to STEP S3008 are identical to the operations of STEP S1005 to STEP S1008 described with reference to FIG. 8.

[Step S3009]

In the case where it is determined that any one key of the plurality of black keys has not been designated ("NO" in STEP S3007), or after STEP S3008, the CPU 201 performs a determining process of determining whether play of the track group has finished.

In the case where it is determined that play of the track group has not finished ("NO" in STEP S3009), the CPU 201 performs STEP S3006.

[Step S3010]

In the case where it is determined that play of the track group has finished ("YES" in STEP S3009), the CPU 201 performs a finishing process of finishing the output of the sounds of the track group.

<2-4> Effects

According to the above-described embodiment, the keyboard 101 has the keys (first operation elements) 101a associated with the section data items included in the plurality of track data items, respectively, and keys 101b (second operation elements) which are not associated with the section data items. The CPU 201 performs the display process of displaying the plurality of first operation elements such that they become distinguishable such that it is possible to designate a first operation element of the plurality of first operation elements in order to output the musical sound based on a section data item associated with the designated first operation element.

As a result, the user can selectively listen only the motifs of the individual tracks. Therefore, as compared to the first embodiment, it is possible to search for desired tracks from a lot of tracks in a shorter time.

<2-5> Modification

Now, a modification of the second embodiment will be described with reference to FIG. 13.

In the second embodiment, when the electronic keyboard instrument 100 plays a track group, if the user designates a specific key, the electronic keyboard instrument sequentially outputs the musical sounds of the track group to the end of the track group. However, when playing a track group, the electronic keyboard instrument 100 may output only the musical sound of a motif designated by the user.

Figure 13:
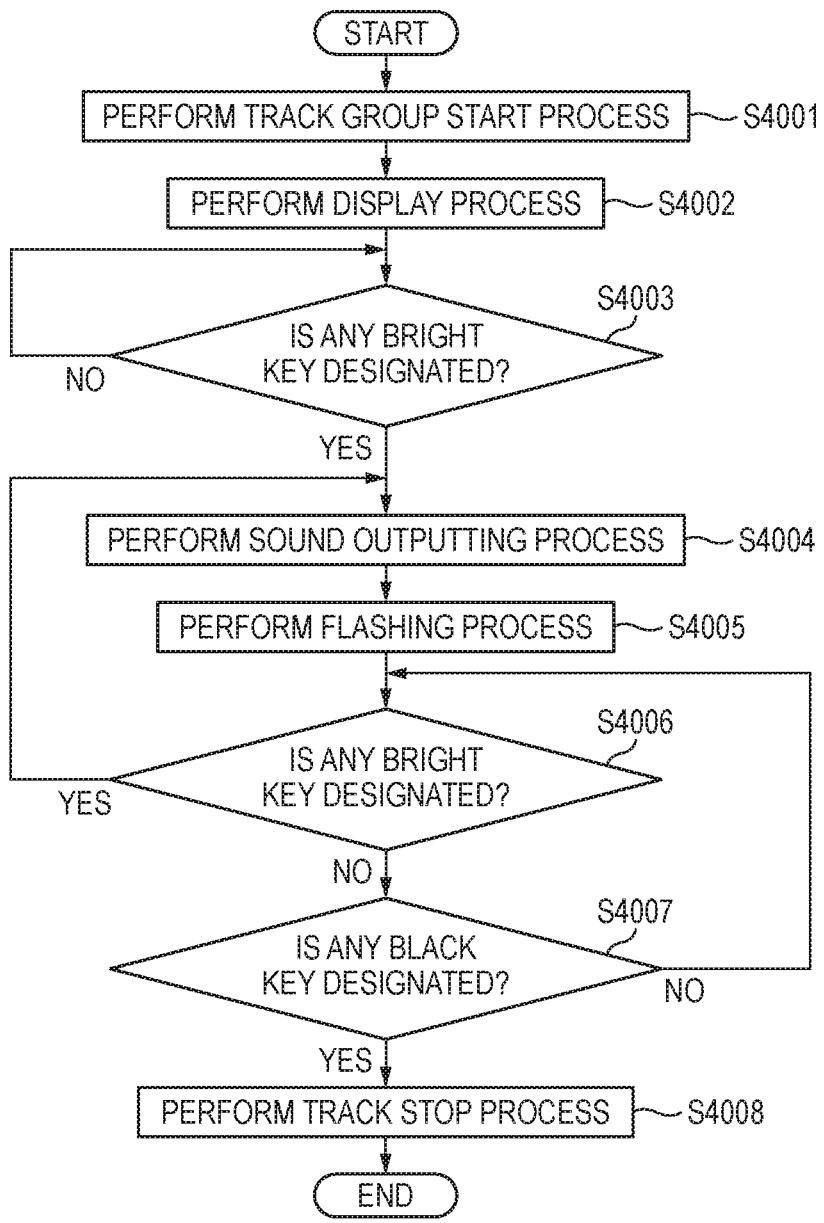
FIG. 13 is a flow chart illustrating operations of the electronic keyboard instrument.

Specifically, the electronic keyboard instrument performs operations as shown in FIG. 13.

[Step S4001] to [Step S4003]

The operations of STEP S4001 to STEP S4003 are identical to the operations of STEP S3001 to STEP S3003 described with reference to FIG. 12.

[Step S4004]

In the case where any one key of the plurality of bright keys has been designated ("YES" in STEP S4003), the CPU 11 performs a sound outputting process of outputting only the musical sound of the motif of the track associated with the designated key.

[Step S4005] and [Step S4006]

The operations of STEP S4005 and STEP S4006 are identical to the operations of STEP S3005 and STEP S3005 described with reference to FIG. 12.

[Step S4007]

In the case where any one key of the plurality of bright keys has not been designated ("NO" in STEP 4006), the CPU 201 performs a determining process of determining whether any one black key of the plurality of black keys has been designated.

In the case where it is determined that any one black key of the plurality of black keys has not been designated ("NO" in STEP S4007), the CPU 11 performs the operation of STEP S4006.

[Step S4008]

The operation of STEP S4008 is identical to the operation of STEP S3008 described with reference to FIG. 12.

As described above, when playing a track group, the electronic keyboard instrument 100 can perform loop play (repetitive play) of a motif designated by the user.

<3> Third Embodiment

A third embodiment will be described. In the third embodiment, the case of giving a lesson on a section designated by the user will be described. Also, the basic configuration and basic operations of an electronic keyboard instrument according to the second embodiment are the same as those of the electronic keyboard instruments according to the first and second embodiments described above. Therefore, a description of the points described in the first and second embodiments will not be made.

<3-1> Operations

Figure 14:
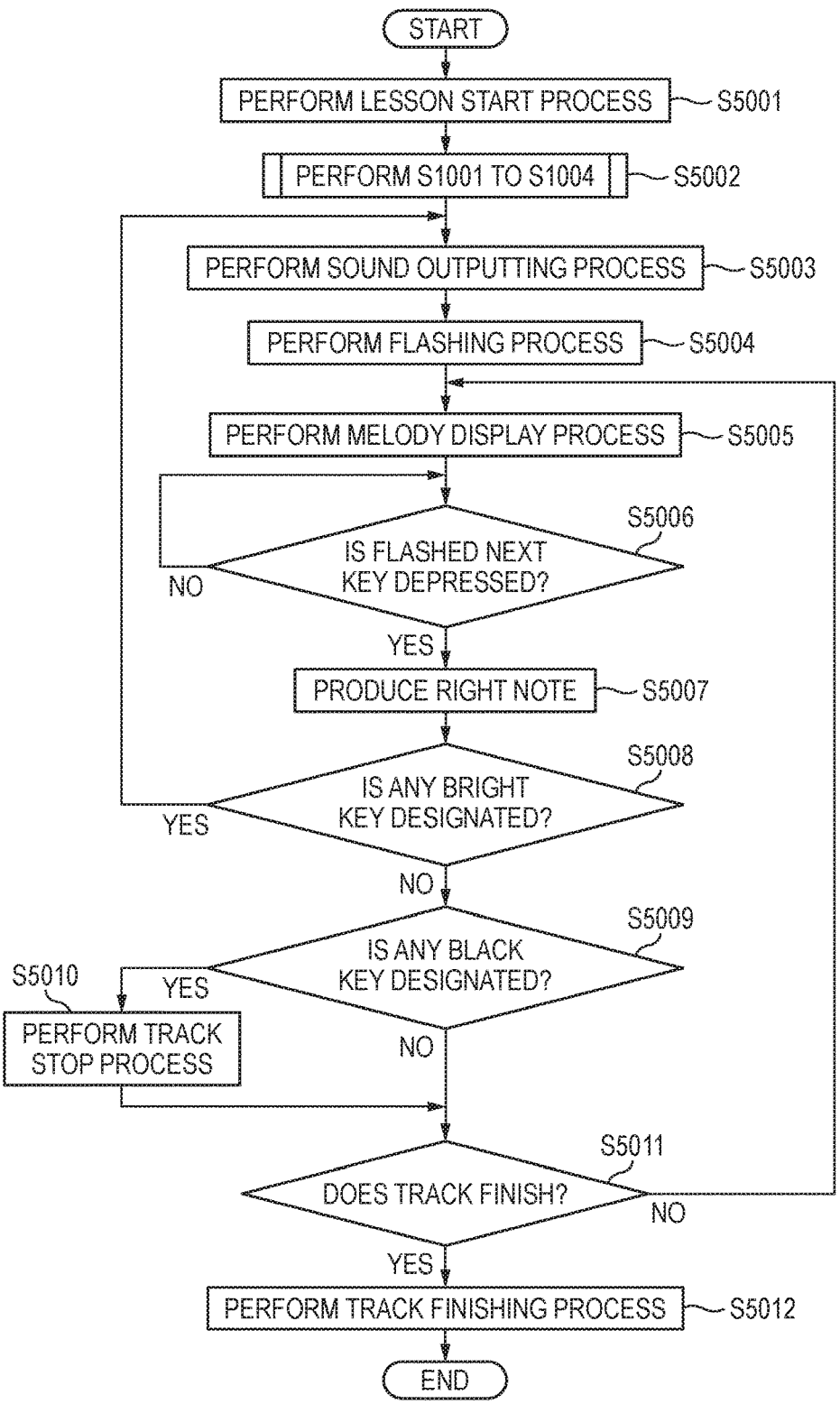
FIG. 14 is a flow chart illustrating operations of the electronic keyboard instrument.

The electronic keyboard instrument 100 according to the present embodiment urges the user to designate a section of a track. Also, the electronic keyboard instrument 100 makes keys, having notes included in the designated section and required to be depressed by the user, sequentially emit light. In other words, the user can easily take a lesson on a desired section by just designating a key. With reference to FIG. 14, operations of the electronic keyboard instrument 100 for playing a track data item will be described.

[Step S5001]

If the user selects a lesson mode switch (not shown in the drawings) of the first switch panel 102 or the second switch panel 103, the CPU 201 performs a lesson start process.

By the lesson start process, the CPU 201 gives a lesson on the selected track data item according to the control program stored in the ROM 202. This lesson on the track is given by making keys, having the notes of the track and required to be designated by the user, emit light. Keys capable of emitting light for lessons are keys 101b. The keys 101a are used to designate a section of a track, but are not used for lessons.

[Step S5002]

The CPU 201 performs the operations of STEP S1001 to STEP S1003 described with reference to FIG. 8.

[Step S5003]

In the case where a key of the plurality of bright keys has been designated ("YES" in STEP 1003), the CPU 11 performs a sound outputting process of outputting the musical sound of the accompaniment data item of the section associated with the designated key. In other words, the CPU 201 performs an accompaniment data sound outputting process of controlling the sound outputting unit such that the sound outputting unit outputs the musical sound based on the accompaniment data item associated with the section designated by the user.

Also, if the user designates a specific key, the CPU 201 outputs the musical sounds of sections arranged in chronological order, to the end of the track, in the order.

[Step S5004]

The CPU 201 performs a flashing process of controlling the LED controller 207 such that the LED controller makes the key associated with the section which is the object of sound output of STEP S5003 flash. As a result, the user can visually determine the section of the track whose sound is being output.

[Step S5005]

Next, in STEP 5002, A phrase display process of making the keys, having the notes included in the section designated by the user and required to be depressed by the user, sequentially emit light (a process of making the next key emit light) is performed. As the melody display process, the CPU 201 determines a key required to be depressed by the user. The notes of keys to be depressed by the user corresponds to the notes represented by the melody data item corresponding to the accompaniment data item whose sound is output by the accompaniment data sound outputting process. Subsequently, the CPU 201 makes the determined key required to be depressed by the user flash. Specifically, the CPU 201 notifies the key number of the determined key, the luminance level, and the light emitting mode (a lighting or flashing mode) to the LED controller 207, such that the LED controller makes the key required to be depressed flash.

[Step S5006]

The CPU 201 performs a determining process of determining whether the flashing next key has been depressed.

In the case where the flashing next key has not been depressed ("NO" in STEP 5006), the CPU 201 repeats STEP 5006.

[Step S5007]

In the case where it is determined that the flashing next key has been depressed ("YES" in STEP S006), the CPU 201 outputs the right note sound.

[STEP S5008] to [Step S5012]

The CPU 201 performs the operations of STEP S1006 to STEP S1010 described with reference to FIG. 8.

<3-2> Effects

According to the above-described embodiment, a track data item includes accompaniment data items which are section data items, and melody data items corresponding to the accompaniment data items. Also, if any one first operation element of the plurality of first operation elements is designated, the CPU 201 performs the accompaniment data sound outputting process of controlling the sound outputting unit such that the sound outputting unit outputs a musical sound based on the accompaniment data item associated with the designated first operation element. Also, the CPU 201 performs the melody display process of making each of the keys, having the notes represented by the melody data item corresponding to the accompaniment data item whose sound is output by the accompaniment data sound outputting process, emit light.

According to the above-described embodiment, it becomes possible for the user to take a lesson on a favorite track with a focus on a specific part.

<3-3> First Modification

Now, a first modification of the third embodiment will be described with reference to FIG. 15.

In the third embodiment, when the electronic keyboard instrument 100 plays a track data item, if the user designates a specific key, the electronic keyboard instrument sequentially outputs the musical sounds of sections arranged in chronological order, to the end of the track. However, when playing a track data item, the electronic keyboard instrument 100 may only the musical sound of a section designated by the user.

Figure 15:
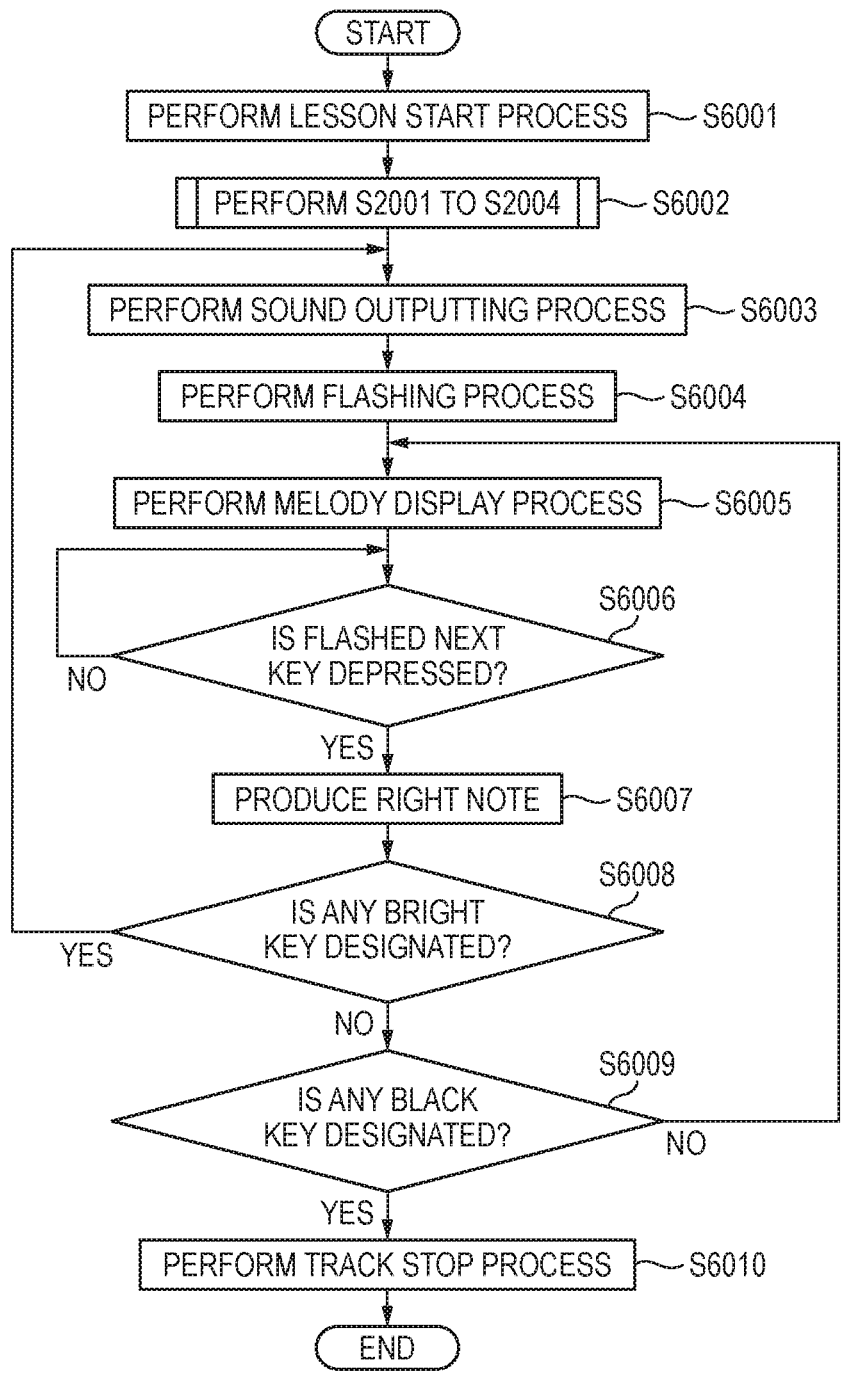
FIG. 15 is a flow chart illustrating operations of the electronic keyboard instrument.

Specifically, the electronic keyboard instrument performs operations as shown in FIG. 15.

[Step S6001]

The CPU 201 performs the operation of STEP S001 described with reference to FIG. 14.

[Step S6002]

The CPU 201 performs the operations of STEP S2001 to STEP S2003 described with reference to FIG. 10.

[STEP S6003] to [Step S6008]

The CPU 201 performs the operations of STEP S003 to STEP S008 described with reference to FIG. 14.

[Step S6009] and [Step S6010]

The CPU 201 performs the operation of STEP 2007 and STEP S2008 described with reference to FIG. 10.

<3-4> Second Modification

Figure 16:
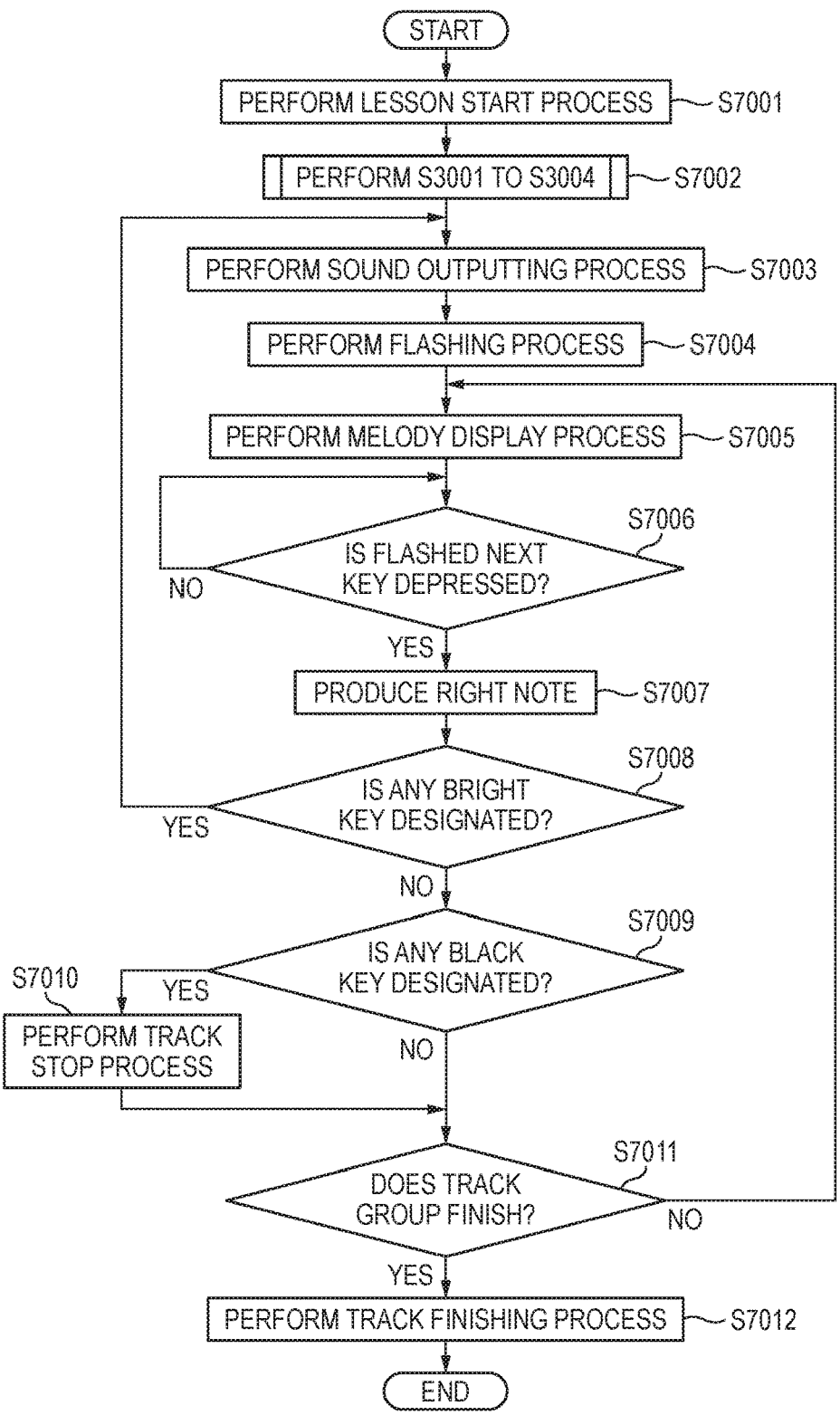
FIG. 16 is a flow chart illustrating operations of the electronic keyboard instrument.

Now, a second modification of the third embodiment will be described with reference to FIG. 16.

The third embodiment and the second embodiment may be combined. Specifically, motifs of a plurality of tracks may be assigned to the keys 101a, such that the user can take a lesson on the motif of a desired track. Specifically, the electronic keyboard instrument performs operations as shown in FIG. 16.

[Step S7001]

The CPU 201 performs the operation of STEP S001 described with reference to FIG. 14.

[Step S7002]

The CPU 201 performs the operations of STEP S3001 to STEP S3003 described with reference to FIG. 12.

[Step S7003] to [Step S7008]

The CPU 201 performs the operations of STEP S003 to STEP S008 described with reference to FIG. 14.

[Step S7009] to [Step S7012]

The CPU 201 performs the operations of STEP S3007 to STEP S3010 described with reference to FIG. 12.

<3-5> Third Modification

Now, a third modification of the third embodiment will be described with reference to FIG. 17.

The third embodiment and the modification of the second embodiment may be combined. Specifically, motifs of a plurality of tracks may be assigned to the keys 101a, such that the user can take a lesson on only the motif of a desired track. In the second modification of the third embodiment, the case of sequentially giving lessons on the motifs of a track group has been described; however, in the present third modification, a lesson on only a designated motif is given.

Figure 17:
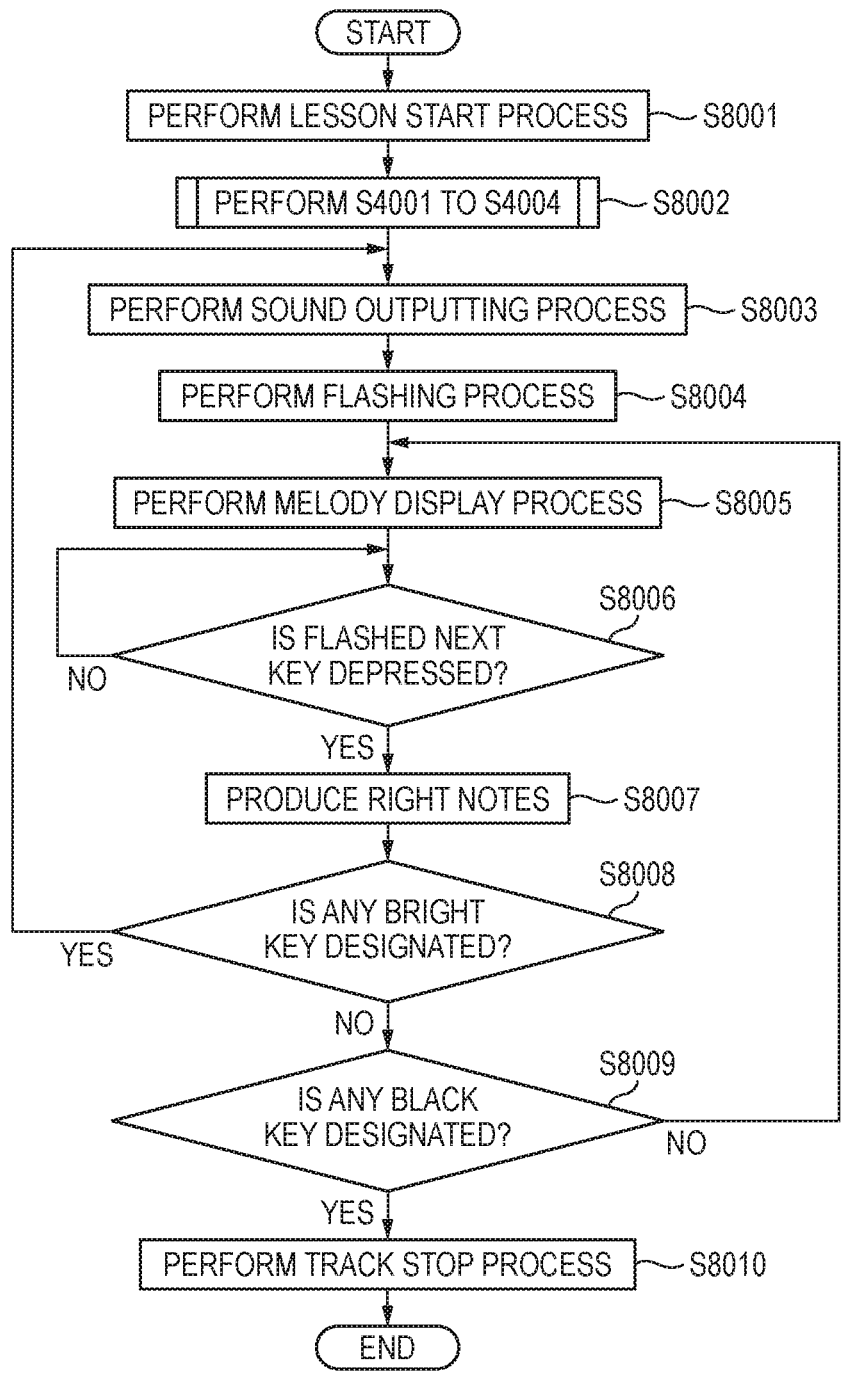
FIG. 17 is a flow chart illustrating operations of the electronic keyboard instrument.

Specifically, the electronic keyboard instrument performs operations as shown in FIG. 17.

[Step S8001]

The CPU 201 performs the operation of STEP S001 described with reference to FIG. 14.

[Step S8002]

The CPU 201 performs the operations of STEP 4001 to STEP 4003 described with reference to FIG. 13.

[Step S8003] to [Step S8008]

The CPU 201 performs the operations of STEP S003 to STEP S008 described with reference to FIG. 14.

[Step S8009] and [Step S8010]

The CPU 201 performs the operations of STEP 4007 and STEP 4008 described with reference to FIG. 13.

Although the specific embodiments of the present invention have been described above, the present invention is not limited to the above embodiments, and various modifications can be made without departing the scope of the present invention. It will be apparent to those skilled in the art that various modifications and variations of the present invention can be made without departing from the spirit or scope of the present invention. Therefore, the present invention is intended to cover modifications and variations that come within the scope of the appended claims and their equivalents. In particular, it is explicitly contemplated that any parts or whole of any two or more of the embodiments and their modifications described above can be combined so as to come within the scope of the present invention.

What is claimed is:

1. A keyboard instrument comprising:
a keyboard that includes a first key specifying a first pitch, a second key specifying a second pitch and a third key specifying a third pitch, when operated, wherein
the first key is associated with first section data corresponding to a first section among a plurality of sections in a piece of music, the first section data includes at least two notes and corresponds to a first period from a first timing to a second timing of the piece of music,
the second key is associated with second section data corresponding to a second section following the first section among the plurality of sections in the piece of music, the second section data includes at least two notes and corresponds to a second period from the second timing to a third timing of the piece of music, and
the third key is not associated with any section data corresponding to any section among the plurality of sections in the piece of music, and
at least one processor electrically connected to the keyboard, wherein the at least one processor is configured to:
display at least one identifier such that the first key and the second key are distinguishable from the third key;
output the first section data as a musical sound when the first key is operated; and
output the second section data as a musical sound when the second key is operated.

2. The keyboard instrument according to claim 1, wherein:
the first key and the second key include light sources respectively, and
the at least one processor is configured to display the at least one identifier by lighting the light sources, such that the first key and the second key are lighted the third key is not lighted.

3. The keyboard instrument according to claim 1, wherein:
the plurality of sections include a verse part and a chorus part,
the first section includes the verse part and the second section includes the chorus part,
the first key and the second key include light sources respectively,
the at least one processor is configured to:
display the at least one identifier by lighting the light sources, such that the first key and the second key are lighted with different luminance levels respectively, and the third key is not lighted.

4. The keyboard instrument according to claim 3, wherein:
the at least one processor is configured to display the at least one identifier by light the light sources, such that the first key and the second key are lighted, based on luminance information items associated with the plurality of sections, respectively.

5. The keyboard instrument according to claim 1, wherein:
the keyboard includes a plurality of white keys and a plurality of black keys, the plurality of white keys includes the first key and the second key, and
in a case where any one of the plurality of black keys is operated, the at least one processor stops the musical sound which is output when the first key or the second key is operated, as a mute process.

6. The keyboard instrument according to claim 1, wherein:
the track data includes accompaniment data on the plurality of sections, and melody data corresponding to the accompaniment data,
the first key is associated with the accompaniment data on the first section, and
the at least one processor is configured to:
when the first key is operated, output a musical sound based on the accompaniment data on the first section; and
make each of individual keys, corresponding to individual notes represented by a phrase data corresponding to the accompaniment data on the first section, emit light to allow a user to operate the corresponding key.

7. A keyboard instrument comprising:
a keyboard that includes a first key specifying a first pitch, a second key specifying a second pitch and a third key specifying a third pitch, when operated, wherein
the first key is associated with first section data corresponding to a first section including at least one chorus part in a first piece of music, the first section data includes at least two notes and corresponds to a first period from a certain timing to another timing of the first piece of music,
the second key associated with second section data corresponding to a second section including at least one chorus part in a second piece of music, the second section data includes at least two notes and corresponds to a second period from a certain timing to another timing of the second piece of music, and
the third key which is not associated with any section data corresponding to any section in both of the first piece of music and the second piece of music, and
at least one processor electrically connected to the keyboard, wherein the at least one processor is configured to:
display at least one identifier such that the first key and the second key are distinguishable from the third key;
output the first section data as a musical sound when the first key is operated; and
output the second section data as a musical sound when the second key is operated.

8. The keyboard instrument according to claim 7, wherein:
the first key and the second key includes light sources respectively, and
the at least one processor is configured to display the at least one identifier by lighting the light sources, such that the first key and the second key are lighted.

9. The keyboard instrument according to claim 7, wherein:
the keyboard includes a plurality of white keys and a plurality of black keys,
the plurality of white keys includes the first key and the second key, and in a case where any one of the plurality of black keys is operated, the at least one processor stops the sound output which is output when the first key or the second key is operated, as a mute process.

10. The keyboard instrument according to claim 7, wherein:
the first-section data includes an accompaniment data, and a phrase data corresponding to the accompaniment data,
the first key is associated with the accompaniment data, and
the at least one processor is configured to:
when the first key is operated, output a musical sound based on the accompaniment data; and
make each of individual keys, corresponding to individual notes represented by the melody data corresponding to the accompaniment data whose sound is output, emit light.

11. A method of a keyboard instrument, which includes: a first key specifying a first pitch and being associated with a first section data corresponding to a first section among a plurality of sections in a piece of music, the first section data including at least two notes and corresponding to a first period from a first timing to a second timing of the piece of music; a second key specifying a second pitch and being associated with a second section data corresponding to a second section following the first section among the plurality of sections in the piece of music, the second section data including at least two notes and corresponding to a second period from the second timing to a third timing of the piece of music; and a third key specifying a third pitch and being not associated with any section data corresponding to any section among the plurality of sections in the piece of music, the method comprising:
displaying at least one identifier such that the first key and the second key are distinguishable from the third key;
outputting the first section data as a musical sound when the first key is operated; and
outputting the second section data as a musical sound when the second key is operated.

12. A method of a keyboard instrument, which includes: a first key specifying a first pitch and being associated with first section data corresponding to a first section including at least one chorus part in a first piece of music, the first section data including at least two notes and corresponding to a first period from a certain timing to another timing of the first piece of music; a second key specifying a second pitch and being associated with a second section data corresponding to a second section including at least one chorus part in a second piece of music, the second section data including at least two notes and corresponding to a second period from a certain timing to another timing of the second piece of music; and a third key specifying a third pitch and being not associated with any section data corresponding to any section in both of the first piece of music and the second piece of music, the method comprising:
displaying at least one identifier such that the first key and the second key are distinguishable from the third key;
outputting the first section data as a musical sound when the first key is operated; and
outputting the second section data as a musical sound when the second key is operated.

* * * * *